(12) United States Patent
Rittenhouse, Jr. et al.

(10) Patent No.: US 12,473,756 B2
(45) Date of Patent: Nov. 18, 2025

(54) ADJUSTABLE LATCH SYSTEMS AND METHODS

(71) Applicant: THE BOEING COMPANY, Arlington, VA (US)

(72) Inventors: Timothy D. Rittenhouse, Jr., Summerville, SC (US); Todd Schackman, Ladson, SC (US)

(73) Assignee: The Boeing Company, Arlington, VA (US)

( * ) Notice: Subject to any disclaimer, the term of this patent is extended or adjusted under 35 U.S.C. 154(b) by 77 days.

(21) Appl. No.: 18/462,591

(22) Filed: Sep. 7, 2023

(65) Prior Publication Data

US 2023/0417085 A1    Dec. 28, 2023

Related U.S. Application Data

(63) Continuation-in-part of application No. 17/511,698, filed on Oct. 27, 2021, now Pat. No. 11,873,852.

(51) Int. Cl.
*E05B 79/04* (2014.01)
*B64D 11/00* (2006.01)

(52) U.S. Cl.
CPC .......... *E05B 79/04* (2013.01); *B64D 11/0023* (2013.01)

(58) Field of Classification Search
CPC ..... B64D 11/0696; B64D 11/06; B64D 11/00; B64D 11/0023; B64D 11/0606; E05B 79/04; B60N 2/01575; B60N 2/07; B60N 2/0868; B60N 2/0818; F16B 2/02; F16B 2/185; F16B 2/18; Y10T 403/32451; Y10T 403/32459; E05C 3/00; E05C 3/02; A47H 1/12; A47H 1/122; A47H 1/124
See application file for complete search history.

(56) References Cited

U.S. PATENT DOCUMENTS

| | | | | | |
|---|---|---|---|---|---|
| 3,745,853 | A | * | 7/1973 | Deibel | B60S 1/24 403/163 |
| 3,837,606 | A | * | 9/1974 | Hikai | E04G 5/04 248/242 |

(Continued)

FOREIGN PATENT DOCUMENTS

| | | |
|---|---|---|
| EP | 4173953 | 5/2023 |
| WO | WO2017205126 | 11/2017 |

OTHER PUBLICATIONS

Communication re EP App. No. 22203791.3-1004, dated Jul. 31, 2024.

(Continued)

*Primary Examiner* — Jason W San
*Assistant Examiner* — Matthew J Sullivan
(74) *Attorney, Agent, or Firm* — Joseph M. Butscher; The Small Patent Law Group LLC

(57) ABSTRACT

A latch system and method are configured to adjustably secure a first component to a second component. The latch system includes a mounting base. A slide plate is moveably coupled to the mounting base. The slide plate is configured to be slidably adjusted relative to the mounting base. A housing is secured to the slide plate. The housing includes an arm channel configured to receive a latch arm. A bumper is coupled to the housing. The bumper is configured to restrain motion of the latch arm within the arm channel.

21 Claims, 15 Drawing Sheets

(56) References Cited

U.S. PATENT DOCUMENTS

| | | | | |
|---|---|---|---|---|
| 3,840,095 | A * | 10/1974 | Matson | F16B 2/02 |
| | | | | 188/42 |
| 4,085,684 | A * | 4/1978 | McLennan | B60P 7/0815 |
| | | | | 410/105 |
| 4,213,593 | A * | 7/1980 | Weik | B64D 11/0696 |
| | | | | 248/501 |
| 4,276,665 | A * | 7/1981 | Mis | A47C 19/04 |
| | | | | 5/200.1 |
| 4,490,883 | A * | 1/1985 | Gauron | E05D 15/58 |
| | | | | 16/361 |
| 4,575,295 | A * | 3/1986 | Rebentisch | F16B 37/046 |
| | | | | 411/85 |
| 4,684,140 | A * | 8/1987 | Olivieri | A63C 17/0086 |
| | | | | 280/11.26 |
| 5,154,385 | A * | 10/1992 | Lindberg | A47B 57/562 |
| | | | | 248/245 |
| 5,421,551 | A * | 6/1995 | LeClaire | A47H 1/122 |
| | | | | 248/265 |
| 5,435,626 | A * | 7/1995 | Lai | A47C 1/03 |
| | | | | 297/411.36 |
| 5,489,173 | A * | 2/1996 | Hofle | F16B 37/046 |
| | | | | 411/85 |
| 5,588,766 | A * | 12/1996 | Lai | F16B 7/105 |
| | | | | 403/107 |
| 6,092,957 | A * | 7/2000 | Fevre | F16B 5/0225 |
| | | | | 403/374.5 |
| 7,070,374 | B2 * | 7/2006 | Womack | B60P 7/0815 |
| | | | | 410/104 |
| 7,293,752 | B2 * | 11/2007 | McCulloch | B60N 2/0818 |
| | | | | 297/312 |
| 7,306,269 | B2 | 12/2007 | Cetnar et al. | |
| 7,320,446 | B2 * | 1/2008 | Saint-Jalmes | B64D 11/0641 |
| | | | | 244/118.6 |
| 7,677,133 | B2 * | 3/2010 | Matsui | B62D 1/184 |
| | | | | 280/775 |
| 7,713,009 | B2 * | 5/2010 | Hudson | B64D 11/0696 |
| | | | | 410/104 |
| 7,721,620 | B2 * | 5/2010 | Matsui | B62D 1/184 |
| | | | | 280/775 |
| 7,874,774 | B2 * | 1/2011 | Peterson | B60P 7/0815 |
| | | | | 410/104 |
| 8,191,829 | B2 * | 6/2012 | Erickson | B64D 11/00 |
| | | | | 244/118.5 |
| 8,360,386 | B2 * | 1/2013 | Marechal | B64D 11/0696 |
| | | | | 410/101 |
| 9,546,000 | B2 * | 1/2017 | Shih | B64D 11/0696 |
| 9,789,965 | B2 * | 10/2017 | Benthien | B60N 2/072 |
| 10,053,204 | B2 * | 8/2018 | King | B64D 11/00 |
| 10,130,178 | B1 * | 11/2018 | Landes | A47B 57/54 |
| 10,179,638 | B2 * | 1/2019 | King | B64D 11/00 |
| 10,384,760 | B2 * | 8/2019 | Telmos | B64D 11/0023 |
| 10,493,895 | B2 * | 12/2019 | Lamoureux | F16B 21/02 |
| 10,577,838 | B2 | 3/2020 | Mitchell et al. | |
| 10,589,863 | B2 * | 3/2020 | Maclay | B64D 11/00 |
| 10,688,895 | B2 * | 6/2020 | Emrich | B60N 2/0818 |
| 10,689,894 | B2 * | 6/2020 | Diez Herrera | B29C 45/16 |
| 10,759,538 | B2 * | 9/2020 | Danet | B64D 11/0696 |
| 10,829,195 | B2 * | 11/2020 | Bobaru | B64C 1/1469 |
| 10,919,632 | B2 * | 2/2021 | Minyard | B64D 11/003 |
| 10,934,758 | B2 * | 3/2021 | Cahill | E05F 5/022 |
| 11,118,386 | B2 * | 9/2021 | Rupp | E05D 15/26 |
| 11,274,786 | B2 * | 3/2022 | Liao | F16B 2/065 |
| 11,345,389 | B2 * | 5/2022 | Buzzard | B62D 1/184 |
| 11,453,313 | B2 * | 9/2022 | Chen | B60N 2/08 |
| 11,498,400 | B2 * | 11/2022 | Aoki | B60J 7/02 |
| 11,560,918 | B2 * | 1/2023 | Sbongk | F16B 37/0842 |
| 11,629,740 | B2 * | 4/2023 | Cai | F16B 7/22 |
| | | | | 403/282 |
| 11,834,891 | B2 * | 12/2023 | Sanchez Burger | E05F 5/022 |
| 11,873,852 | B2 * | 1/2024 | Rittenhouse, Jr. | |
| | | | | B64D 11/0696 |
| 11,926,420 | B2 * | 3/2024 | Skelly | B64D 11/0023 |
| 11,938,846 | B2 * | 3/2024 | Parker | B60N 2/0806 |
| 2002/0122709 | A1 * | 9/2002 | Diamante | B64D 11/0696 |
| | | | | 410/77 |
| 2007/0138821 | A1 * | 6/2007 | Mejuhas | B64D 11/0696 |
| | | | | 244/118.6 |
| 2009/0080995 | A1 * | 3/2009 | Peterson | B60P 7/0815 |
| | | | | 410/104 |
| 2009/0282655 | A1 * | 11/2009 | James | B64C 1/20 |
| | | | | 24/458 |
| 2010/0096502 | A1 * | 4/2010 | VanderWolk | B64D 11/0696 |
| | | | | 248/503.1 |
| 2011/0309195 | A1 * | 12/2011 | Bishop | B64D 11/0696 |
| | | | | 244/118.6 |
| 2011/0315731 | A1 * | 12/2011 | Takemura | B60P 7/0815 |
| | | | | 224/567 |
| 2012/0217368 | A1 * | 8/2012 | Zunino | B64C 1/20 |
| | | | | 410/105 |
| 2013/0306827 | A1 * | 11/2013 | Koller | B60N 2/005 |
| | | | | 248/429 |
| 2014/0064827 | A1 * | 3/2014 | Korenromp | B64D 11/00 |
| | | | | 403/63 |
| 2014/0151503 | A1 * | 6/2014 | De La Fuente Carnero | |
| | | | | A61G 3/0866 |
| | | | | 244/118.6 |
| 2016/0016668 | A1 * | 1/2016 | Danet | F16B 2/185 |
| | | | | 248/188.9 |
| 2016/0039314 | A1 * | 2/2016 | Anticuar | B60N 2/0715 |
| | | | | 248/429 |
| 2022/0274507 | A1 * | 9/2022 | Gilbert | B60N 2/01575 |
| 2022/0307305 | A1 * | 9/2022 | Duer | E05D 15/264 |
| 2023/0130210 | A1 * | 4/2023 | Rittenhouse, Jr. | B64D 11/00 |
| | | | | 24/457 |
| 2024/0318486 | A1 * | 9/2024 | Sendar | E05F 5/003 |
| 2024/0416802 | A1 * | 12/2024 | Ganet | B60N 2/0715 |

OTHER PUBLICATIONS

Extended European Search Report for EP 24196404.8-1004, dated Dec. 2, 2024.

* cited by examiner

ADJUSTABLE LATCH SYSTEMS AND METHODS

CROSS-REFERENCE TO RELATED APPLICATION

This application is a continuation-in-part of U.S. patent application Ser. No. 17/511,698, filed Oct. 27, 2021, entitled "Adjustable Latch Systems and Methods," now U.S. Pat. No. 11,873,852, which is hereby incorporated by reference in its entirety.

FIELD OF THE DISCLOSURE

Examples of the present disclosure generally relate to latch systems, and more particularly to adjustable latch systems configured to adjustably couple components together.

BACKGROUND

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle. A curtain moveably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

During flights, lights within one passenger section may be on, while lights within an adjacent passenger section may be off. Some aircraft include a header over a curtain section that is configured to limit or shade light between sections. A known header includes a panel formed of a solid material. The solid header typically straddles onto an upper curtain track of the curtain in a linear fashion. For example, the solid header may straddle either side of a curtain track and be secured thereto. Another known header is configured to block or otherwise limit passage of light over curtain assemblies within an interior cabin of an aircraft. The header is sturdy, robust, and aesthetically agreeable in that it may contour and blend with inboard or outboard structures (such as through smooth, arcuate transitions).

Typically, a header is secured to another structure, such as a portion of a bin assembly, a portion of an environmental control system, a monument, and/or the like by a plurality of latches, which are fixed in position relative to the header. However, known latches constrain the position of the header position. Once the header is installed, there is typically no ability to adjust the position of the header. As such, if an individual finds that the header is too far away or too close to another structure after installation, the header typically needs to be removed from the other structure, and the latches themselves need to be removed and/or reworked in relation to the header.

SUMMARY OF THE DISCLOSURE

A need exists for an adjustable latch system. Further, a need exists for a latch system that is configured to latchably secure a first component to a second component and for adjustment of the first component in relation to the second component after the first component is latchably secured to the first component. Also, a need exists for a latch system that allows an individual to adjust a header without removing the header or performing additional rework.

With those needs in mind, certain examples of the present disclosure provide a latch system configured to adjustably secure a first component to a second component, the latch system comprising. The latch system includes a mounting base. A slide plate is moveably coupled to the mounting base. The slide plate is configured to be slidably adjusted relative to the mounting base. A housing is secured to the slide plate. The housing includes an arm channel configured to receive and retain a latch arm. A bumper is coupled to the housing. The bumper is configured to restrain motion of the latch arm within the arm channel.

The bumper can be formed of rubber. In at least one example, the bumper includes an annular wall extending from a support surface. The annular wall can inwardly cant from the support surface toward a central axis of the bumper. The bumper can include a central channel that is configured to receive a fastener that secures the bumper to a base of the housing.

The mounting base can include one or more adjustment tracks. The one or more adjustment tracks can include a first track segment separated from a second track segment by a gap. The first track segment can be disposed at a first end of the mounting base. The second track segment can be disposed at a second end of the mounting base. The gap can be aligned about a central lateral axis of the mounting base.

The slide plate can include one or more securing extensions outwardly extending from one or both ends of a main body. The one or more securing extensions are configured to receive one or more fasteners that are configured to secure a spring member to the slide plate.

In at least one example, a spring member is disposed between the mounting base and the slide plate. The spring member exerts a spring force between the mounting base and the slide plate. In at least one example, the spring member includes a cross strap, and bowed legs longitudinally extending from the cross strap. The cross strap can include a through hole configured to receive a fastener that secures the spring member to the slide plate. The bowed legs can downwardly bow into and against a panel of the mounting base.

In at least one example, a release lever is pivotally coupled to the housing. The release lever is configured to pivot between a securing position, in which the latch arm is securely trapped within the arm channel, and a release position, in which the latch arm is removable from the arm channel. A cuff bracket can be coupled to the release lever.

In at least one example, the first component is an assembly within an internal cabin of a vehicle. The second component is a structure that latchably secures to the assembly through the latch system. The mounting base of the latch system is securely fixed to one of the assembly or the structure.

DETAILED DESCRIPTION OF THE DISCLOSURE

Figure 1:
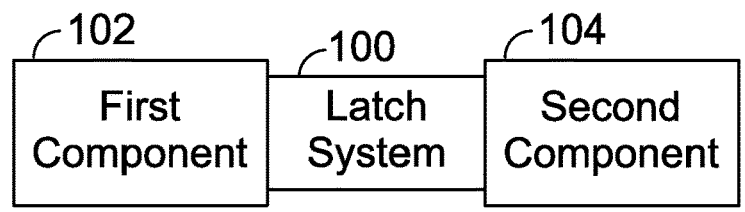
FIG. 1 illustrates a schematic block diagram of a latch system that latchably secures a first component to a second component, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a latch system that allows an individual to adjust a first component (such as a header) in relation to a second component (such as a portion of a valence, a bin assembly, a portion of an environment control system, a portion of a monument, or the like) without removing the first component from the second component, or preforming additional rework. For example, if the gap between a header and a valance is out of tolerance, an individual can push up on the header, and slide the light header inboard or outboard to achieve a desired spacing between the header and the valence.

In at least one example, the latch system allows an individual installing a header (for example, a light limiting header) to adjust an inboard/outboard location of the header by simply pushing up on the header and sliding the header inboard or outboard, as desired. The latch system allows for the header to be adjusted in relation to another component (such as a valence, overhead stowage bin assembly, monument, or the like) without removing the header from the other component. As such, the latch system provides for efficient and effective installation and manufacturing, thereby reducing labor time and costs.

Certain examples of the present disclosure provide an adjustable latch system for adjusting a gap between adjacent panels or other structures. The latch system includes an adjustable slide plate, a housing mount, and a compliant spring member. In at least one example, the latch system can provide at least ½ inch of total linear adjustable movement, can move in ⅛ inch or 1/16 inch increments. In operation, and when assembled, an individual can push upwardly on a header panel, which releases the adjustable slide plate from the housing mount to facilitate lateral sliding of the header (relative to an adjacent panel), and then release pressure from the header, which automatically locks the adjustable slide plate to the housing mount (due to gravity and friction and locking of teeth or pins on the slide plate to slots on the housing). The compliant spring member applies pressure between the slide plate and the housing to prevent accidental unlocking of the latch due to turbulence induced vibrations. The latch system and method of adjustment facilitate blind adjustment capability by an individual, which is advantageous because prior known solutions require manual adjustment of the latch and/or removal panels to facilitate micro adjustments.

FIG. 1 illustrates a schematic block diagram of a latch system 100 that latchably secures a first component 102 to a second component 104, according to an example of the present disclosure. The latch system 100 can be adjustably secured to the first component 102. The latch system 100 latchably secures to a reciprocal structure secured to the second component 104. Optionally, the latch system 100 can be adjustably secured to the second component 104, and the reciprocal structure can be secured to the first component 104. It is to be understood that the terms first and second are merely to identify the number of component. The first component can be the second component, and vice versa.

In at least one embodiment, the latch system 100 includes a base surface that is parallel with a surface of a floor, ground, or the like. As such, the latch system 100 can be horizontally oriented. As another example, the latch system 100 can be orthogonal to the surface of the floor, ground, or the like. Accordingly, the latch system 100 can be vertically oriented. As another example, the latch system 100 can be oriented at any angle between a horizontal orientation and a vertical orientation.

The first component 102 and the second component 104 can be structures within an internal cabin of a vehicle, such as a commercial aircraft. As one example, the first component 102 is a header. The second component 104 can be a portion of an overhead bin assembly. As another example, the second component 104 can be a portion of an environmental control system. As another example, the second component 104 can be a monument within an internal cabin, such as a portion of a lavatory, a closet, a galley section, and/or the like.

Optionally, the latch system 100 can be used with various components whether or not within an internal cabin. For example, the first component 102 can be a first portion of a barrier, such as a fence, and the second component 104 can be a second portion of the barrier, a gate, or the like. It is to be understood that examples of the first component 102 and the second component 104 are provided, but the latch system 100 can be used with respect to various other components that are configured to be securely latched together.

As described herein, after the first component 102 is latchably secured to the second component 104 by the latch system 100, the latch system 100 can be moveably adjusted to provide adjustment between the first component 102 and the second component 104. As such, the first component 102 can be adjusted relative to the second component 104, via the latch system 100, without the first component 102 being disconnected or otherwise removed from the second component 104.

Figure 2:
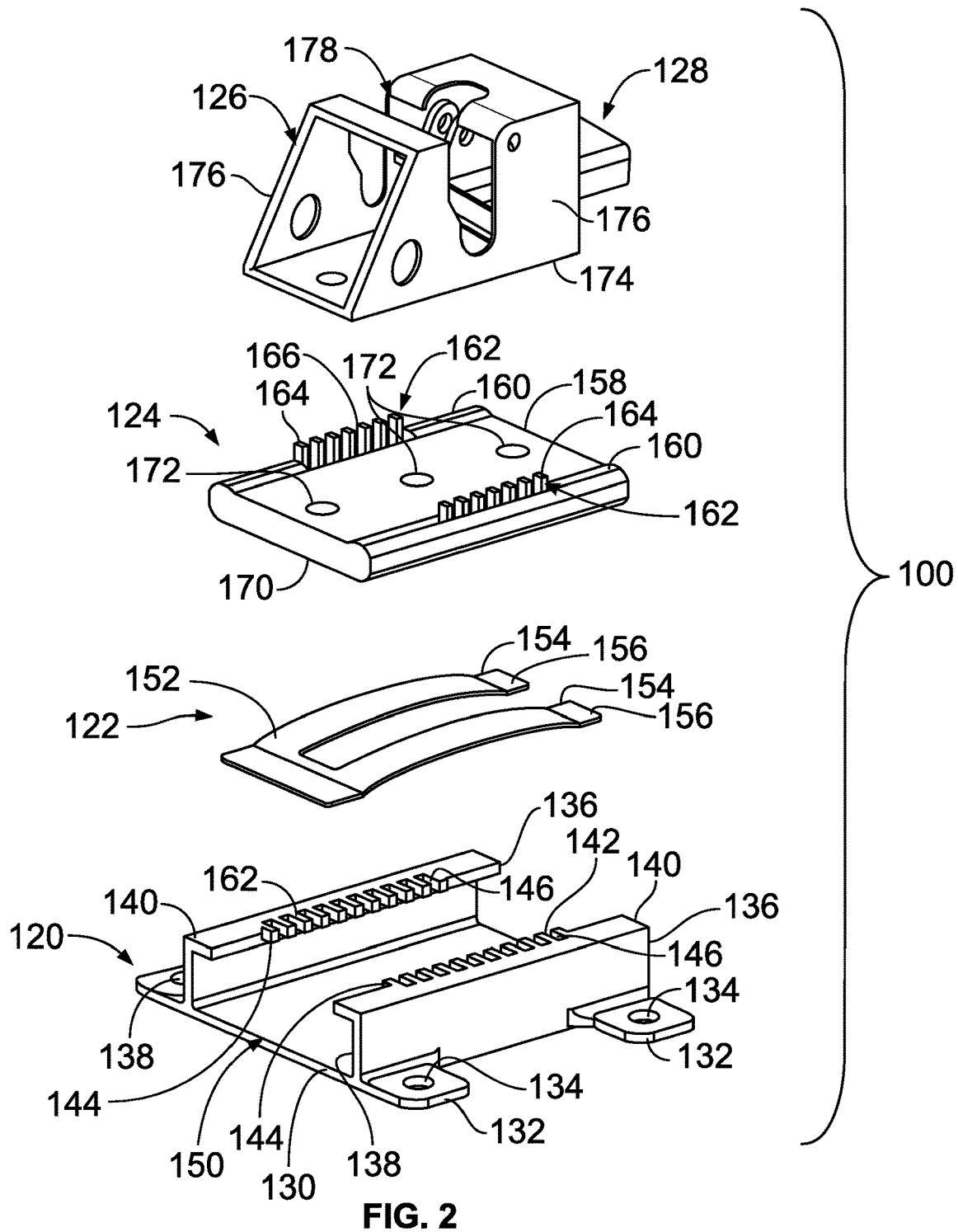
FIG. 2 illustrates an isometric exploded view of a latch system, according to an example of the present disclosure.

FIG. 2 illustrates an isometric exploded view of the latch system 100, according to an example of the present disclosure. The latch system 100 includes a mounting base 120, a spring member 122, a moveable slide plate 124, a housing 126, and a release lever 128 pivotally coupled to the housing 126.

The mounting base 120 includes a panel 130, which can be a flat, planar sheet. The panel 130 can include tabs 132 having through holes 134 that are configured to receive fasteners, such as screws, bolts, or the like. The panel 130 is configured to be fixedly secured to a structure, such as a surface of the first component 102 (or optionally, the second component 104), shown in FIG. 1. Opposed rails 136 upwardly extend from the panel 130. The opposed rails 136 are spaced apart from one another. Each rail 136 includes an extension wall 138 extending from the panel 130. An orthogonal cross ledge 140 angles inwardly from a top edge of the extension wall 138. The cross ledges 140 of the opposed rails 136 are directed toward one another. The cross ledge 140 can be perpendicular to the extension wall 138.

Each of the cross ledges 140 includes an adjustment track 142. The adjustment track 142 includes an alternating series of teeth 144 (for example, pins, peaks, posts, or the like) and retainers 146, such as recesses or openings. Optionally, only one of the cross ledges 140 may include an adjustment track 142.

An adjustment channel 150 is defined between the panel 130 and the rails 136. The spring member 122 is disposed within the adjustment channel 150.

In at least one example, the spring member 122 includes a cross strap 152 and arcuate, bowed legs 154 longitudinally extending from the cross strap 152. The legs 154 connect to distal feet 156. The cross strap 152 and the feet 156 are configured to abut against the panel 130 within the adjustment channel 150, while the legs 154 upwardly bow above the panel 130. The spring member 122 provides a spring force that is exerted between the panel 130 and the slide plate 124. Optionally, the spring member 122 can be sized, shaped, and configured differently than shown. For example, the spring member 122 can be or include one or more metal coil sections. Alternatively, the latch system 100 may not include the spring member 122.

The slide plate 124 includes a planar main body 158 and lateral ridges 160 extending upwardly from either side of the main body 158. Adjustment tracks 162 upwardly extend from the lateral ridges 160. Like the cross ledges 140 of the mounting base 120, the adjustment tracks 162 include an alternating series of teeth 164 and retainers 166, such as recesses or openings. Optionally, only one of the ridges 160 may include an adjustment track 162.

The slide plate 124 is moveably secured within the adjustment channel 150. The spring member 122 is disposed between the panel 130 and an underside 170 of the slide plate 124. The spring member 122 exerts a spring force between the panel 130 and the slide plate 124, thereby urging the adjustment tracks 162 of the slide plate 124 into the adjustment tracks 142 of the mounting base 120. The teeth 164 of the adjustment tracks 162 of the slide plate 124 are retained within the retainers 146 of the adjustment tracks 142 (and the teeth 144 of the adjustment tracks 142 are retained within the retainers 166 of the adjustment tracks 162) to securely lock the slide plate 124 in position relative to the mounting base 120.

The housing 126 secures onto the slide plate 124. For example, the slide plate 124 can include one or more through holes 172 that are configured to receive one or more fasteners that secure a base 174 of the housing 126 to the slide plate 124. The through holes 172 may include a helicoil, which has interior threads (to receive and retain a fastener) and exterior threads (that allow for tapping into a component). Optionally, the slide plate 124 may not be secured to the housing 126 through fasteners. Instead, the slide plate 124 can be fixed to the panel 130 through adhesives, for example. As another example, the slide plate 124 can be integrally formed with the housing 126. For example, the slide plate 124 can form part of the base 174 of the housing 126.

The housing 126 includes a plurality of walls 176 upwardly extending from the base 174. An arm channel 178 is formed between and/or through one or more of the walls 176. The arm channel 178 is configured to latchably retain a latch arm of a reciprocal structure, as is known. The release lever 128 pivotally couples to the housing 126. The release lever 128 is configured to pivot between a securing position, in which the latch arm is securely trapped within the arm channel 178, and a release position, in which the latch arm can be removed from the arm channel 178.

Referring to FIGS. 1 and 2, as described herein, examples of the present disclosure provide the latch system 100 configured to adjustably secure the first component 102 to the second component 104. The latch system 100 includes the mounting base 120. The slide plate 124 is moveably coupled to the mounting base 120. The slide plate 124 is configured to be slidably adjusted relative to the mounting base 120. The housing 126 secured to the slide plate 124.

The housing 126 includes the arm channel 178 configured to receive and retain a latch arm therein.

Figure 3:
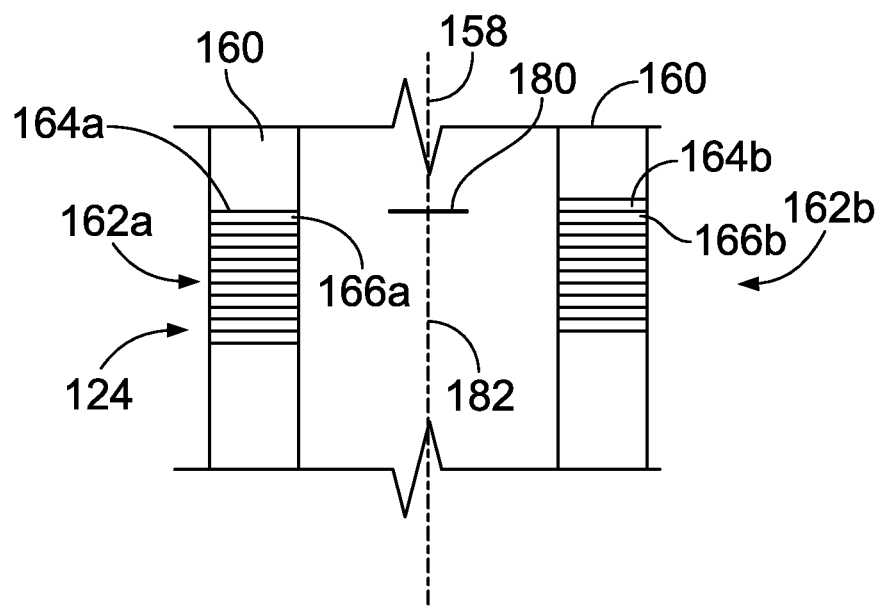
FIG. 3 illustrates a top view of a slide plate, according to an example of the present disclosure.

FIG. 3 illustrates a top view of the slide plate 124, according to an example of the present disclosure. As shown, the adjustment tracks 162a and 162b on opposite ridges 160 can be offset with respect to one another. That is, teeth 164a of the adjustment track 162a are laterally aligned with retainers 166b of the adjustment track 162b. Similarly, teeth 164b of the adjustment track 162b are laterally aligned with retainers 166a of the adjustment track 162a. Laterally aligned refers to being within a common plane 180 that is at a right angle with a longitudinal plane 182 of the slide plate 124, for example. The adjustment tracks 142 of the mounting base 120 are similarly offset from one another.

Referring to FIGS. 2 and 3, the teeth 144 of the adjustment tracks 142 can be spaced apart a particular desired distance, such as ⅛ inch. Similarly, the teeth 164 of the adjustment tracks 162 can be spaced the same distance. By offsetting the tracks 162a and 164a (and the tracks 142 of the mounting base), the slide plate 124 can be removed from the mounting base 120, and rotated 180 degrees, in order to provide finer adjustment, such as distances of 1/16 inch. The slide plate 124 shown and described with respect to FIGS. 17-22 can also rotated to provide finer adjustment.

In at least one embodiment, the slide plate 124 includes a first adjustment track 162a and a second adjustment track 162b that are configured to couple to one or more reciprocal adjustment tracks 142 of the mounting base 120. In at least one example, the first adjustment track 162a is offset with respect to the second adjustment track 162b.

Alternatively, the adjustment tracks 162a and 162b may not be offset with respect to one another. Instead, the adjustment tracks 162a and 162b can be axially aligned with respect to one another. The dual adjustment tracks 162a and 162b mated with the reciprocal adjustment tracks 142 of the mounting base 120 provide increased retaining strength, whether or not they are offset with respect to one another. Also, alternatively, the slide plate 124 may include only one adjustment track 162 that is configured to mate with a single adjustment track 142 of the mounting base 120.

Figure 4:
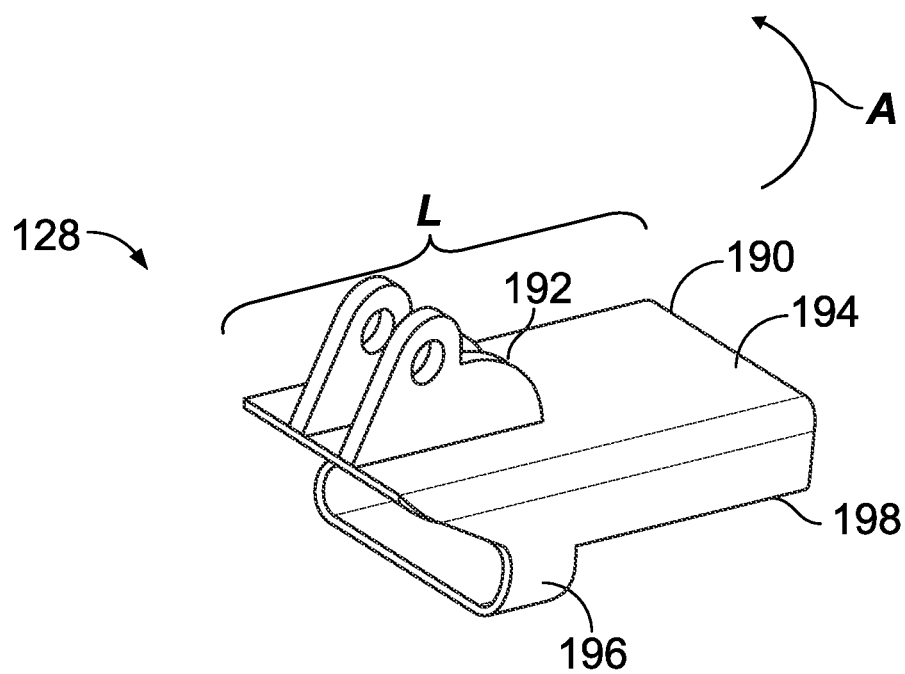
FIG. 4 illustrates an isometric view of a release lever, according to an example of the present disclosure.

FIG. 4 illustrates an isometric view of the release lever 128, according to an example of the present disclosure. The release lever 128 includes a beam 190 having pivot fins 192 upwardly extending from a top surface 194, and an arm cuff 196 downwardly extending from a bottom surface 198.

Referring to FIGS. 2 and 4, the pivot fins 192 are pivotally coupled to the housing 126, such as through a pin. In this manner, the release lever 128 is configured to pivot in relation to the housing 126. In the securing position, a portion of a latch arm (such as a distal tip) is retained between the beam 190 within the arm cuff 196. In order to release the latch arm. The beam 190 is urged upwardly in the direction of arc A, thereby causing the release lever 128 to rotate, and release the portion of the latch arm from the arm cuff 196.

In at least one example, the length L of the release lever 128 is longer than prior known release lever. For example, a length of a prior known release lever is less than 1¼ inches (1.25 inches). However, the length L of the release lever 128 can be ¼-½ inches (0.25 inches-0.5 inches) longer than the length of the prior known release lever. For example, the length L can be 1½-1¾ inches (1.5-1.75 inches). The greater length L allows for engagement of the release lever 128 over an adjustment range of the latch system 100 (shown in FIGS. 1 and 2). Optionally, the length L can be less than 1.5 inches or greater than 1.75 inches. In at least one other example, the release lever 128 is sized and shaped the same as the prior known release lever.

Figure 5:
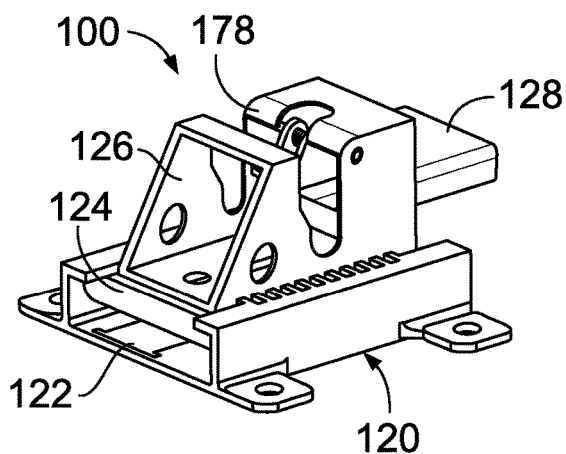
FIG. 5 illustrates an isometric view of the latch system.

FIG. 5 illustrates an isometric view of the latch system 100. Referring to FIGS. 1-5, the mounting base 120 is fixed to the first component 102. A latch arm secured to the second component 104 is latchably secured within the arm channel 178 of the housing 126. The spring member 122 exerts a spring force between the slide plate 124 and the mounting base 120, thereby securing the adjustment track(s) 162 of the slide plate 124 to the adjustment track(s) 142 of the mounting base 120 (for example, the teeth 164 of the adjustment track(s) 162 are trapped within the retainers 146 of the adjustment track(s) 142).

Figure 6:
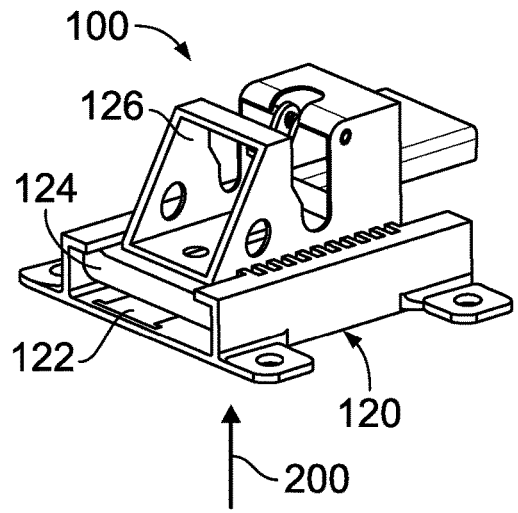
FIG. 6 illustrates an isometric view of the latch system being initially moved, according to an example of the present disclosure.

FIG. 6 illustrates an isometric view of the latch system 100 being initially moved, according to an example of the present disclosure. Referring to FIGS. 1-6, in order to linearly adjust the latch system 100, the first component 102 is urged in the direction of arrow 200 (such as in an upward direction). As the first component 102 is moved in the direction of arrow 200, the mounting base 120 moves in response thereto (as the mounting base 120 is fixed to the first component 102. In response, the spring member 122 is flattened, and the slide plate 124 remains in position, as it is underneath the housing 126, which is latchably coupled to the latch arm fixed in position in relation to the second component 104. Accordingly, the adjustment track(s) 162 of the slide plate 124 disengage from the adjustment track(s) 142 of the mounting base 120. As shown in FIG. 6, as the mounting base 120 is pushed up, the spring member 122 compresses, thereby disengaging the adjustment track(s) 162 of the slide plate from the adjustment track(s) 142 of the mounting base 120.

Figure 7:
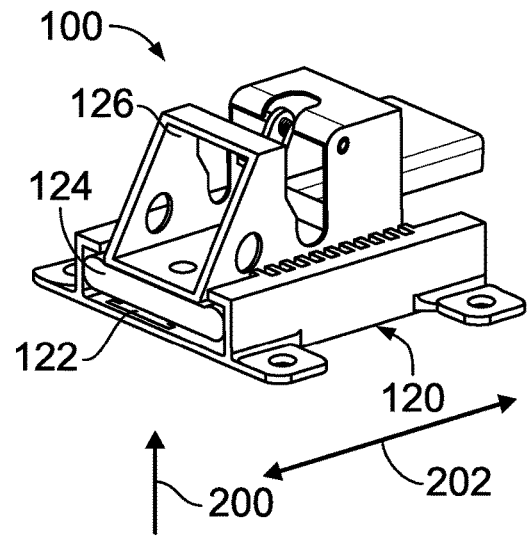
FIG. 7 illustrates an isometric of the latch system being adjusted, as desired.

FIG. 7 illustrates an isometric of the latch system 100 being adjusted, as desired. Referring to FIGS. 1-7, with the force in the direction of arrow 200 being applied, such that the adjustment track(s) 162 are no longer locked in place with respect to the adjustment track(s) 142 of the mounting base 120, the mounting base 120 (and the first component 102) can be linearly adjusted in the directions of arrow 202, as the slide plate 124 can be slid relative to the housing base 120. Adjustment in the directions of arrow 202 occurs while the force is exerted in the direction of arrow 200 so that the adjustment track(s) 162 remain disengaged from the adjustment track(s) 142 until a desired position is released. The mounting base 120 can slide back and forth in the directions of arrow 202, while the upward force in the direction of arrow 200 is maintained.

At the desired position, the force in the direction of arrow 200 is removed, and the adjustment track(s) 142 re-seat onto the adjustment track(s) 162, such that the teeth 164 of the adjustment track(s) 162 lock into reciprocal retainers 146 of the adjustment track(s) 142, thereby locking the mounting base 120 in position relative to the slide plate 124 (and the housing 126 secured to the slide plate 124). The spring member 122 exerts a spring force between the mounting base 120 and the slide plate 124 so that the adjustment track(s) 162 are not inadvertently dislodged from the adjustment track(s) 142 (such as, for example, during periods of turbulence experienced by an aircraft). Alternatively, the latch system 100 may not include the spring member 122.

Figure 8:
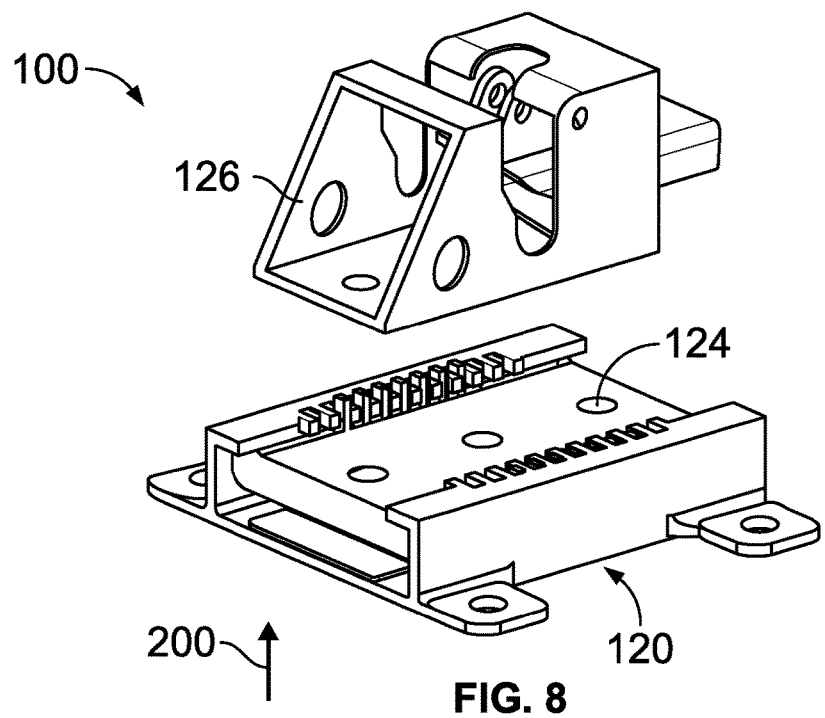
FIG. 8 illustrates an isometric view of a housing removed from a slide plate, according to an embodiment of the present disclosure.

FIG. 8 illustrates an isometric view of the housing 126 removed from the slide plate 124, according to an embodiment of the present disclosure. As noted, the housing 126 can be secured to the slide plate 124 through one or more fasteners. Referring to FIGS. 1-8, in order to provide finer adjustment of the mounting base 120 relative to the slide plate 124, the housing 126 can first be removed from the slide plate 124. The mounting base 120 can then be urged relative to the slide plate 124 in the direction of arrow 200, thereby disengaging the adjustment tracks 162 from the adjustment tracks 142.

Figure 9:
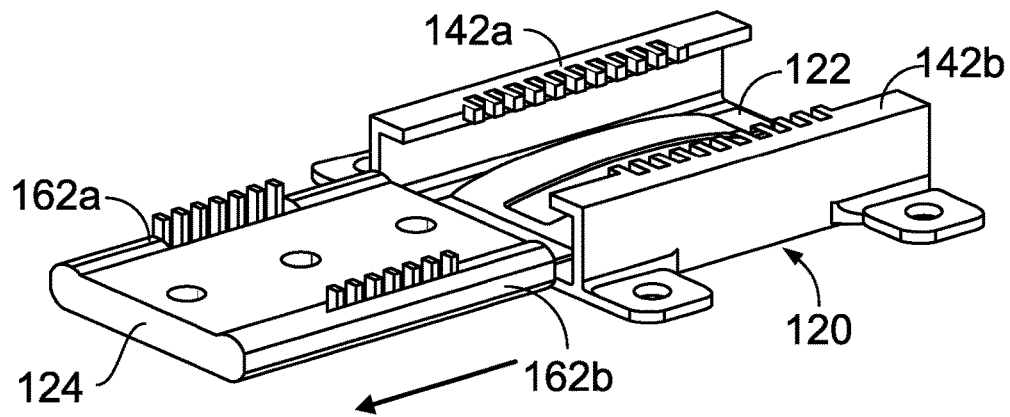
FIG. 9 illustrates an isometric view of the slide plate removed from a mounting base, according to an embodiment of the present disclosure.

FIG. 9 illustrates an isometric view of the slide plate 124 removed from the mounting base 120, according to an embodiment of the present disclosure. Referring to FIGS. 1-9, with continued urging in the direction of arrow 200, such that the adjustment tracks 162 are disengaged from the adjustment tracks 142, the slide plate 124 can be removed from the mounting base 120.

Figure 10:
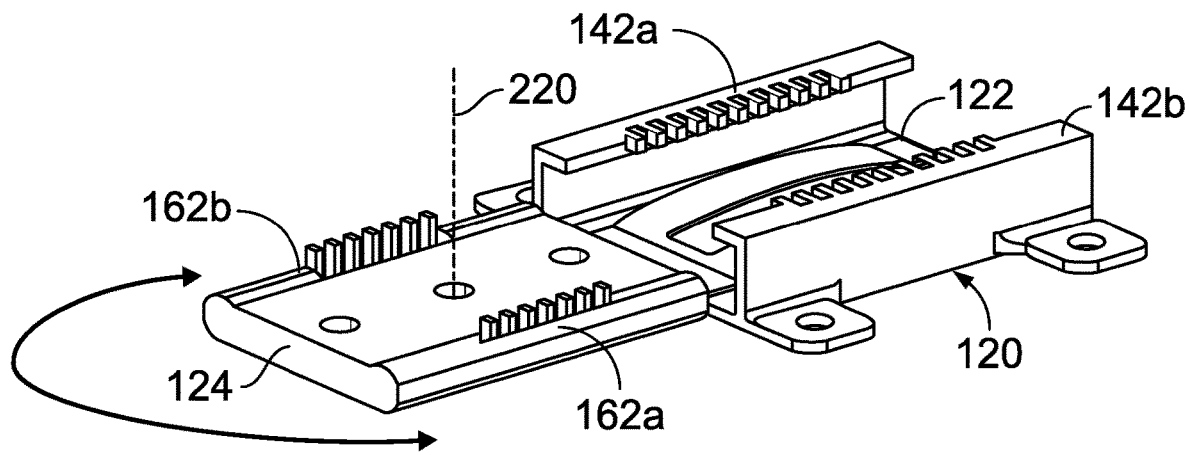
FIG. 10 illustrates an isometric of the slide plate rotated into a different position relative to the mounting base.

FIG. 10 illustrates an isometric of the slide plate 124 rotated into a different position relative to the mounting base 120. Because the adjustment tracks 162a and 162b of the slide plate 124 are offset from one another (and the adjustment tracks 142a and 142b of the mounting base 120 are similarly offset with respect to one another), the slide plate 124 can be rotated 180 degrees about a central axis 220 and reinserted into the mounting base 120 to provide finer tuned adjustment. For example, adjustment of the slide plate 124 relative to the mounting base 120 can be in ⅛ inch steps. The teeth and retainers of the respective adjustment tracks 142 and 162 are offset to provide a 1/16 inch adjustment when the slide plate 124 is rotated 180 degrees, as described. That is, removing and rotating the slide plate provides adjustment in 1/16 inch increments.

As described, in at least one example, the slide plate 124 includes a first (plate) adjustment track 162a and a second (plate) adjustment track 162 configured to be selectively secured and unsecured from one or both of a first (base) adjustment track 142a and a second (base) adjustment track 142b (for example, the mounting base 120 may include just one of the adjustment tracks 142a or 142b, or may include both). In at least one example, the first adjustment track 162a is offset with respect to the second adjustment track 162b.

As described with respect to FIGS. 8-10, the slide plate 124 is configured to be removed from the mounting base 120. The slide plate 124 can then be rotated about the central axis 220 to a different radial position relative to the mounting base 120. The slide plate 124 can then be re-inserted into the mounting base 120 at the different radial position.

Figure 11:
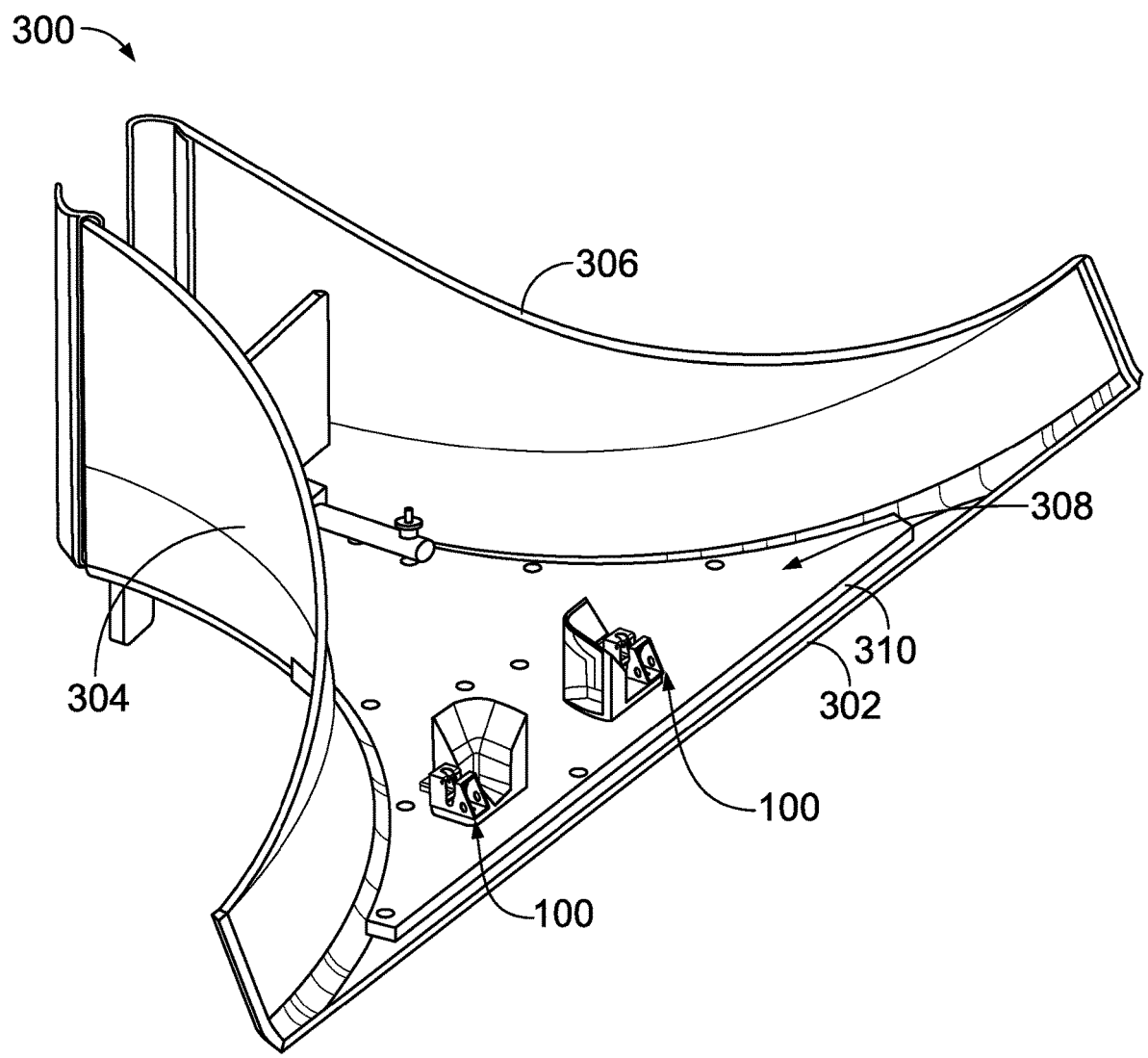
FIG. 11 illustrates an isometric top view of a header assembly, according to an example of the present disclosure.

FIG. 11 illustrates an isometric top view of a header assembly 300, according to an example of the present disclosure. The header assembly 300 is an example of a first component 102 (shown in FIG. 1), or optionally, a second component 104 (shown in FIG. 1). The header assembly 300 is configured to be disposed within an internal cabin of a vehicle, such as a commercial aircraft.

The header assembly 300 includes a base panel 302, and opposed arcuate walls 304 and 306 upwardly extending from the base panel 302. An internal chamber 308 is defined between the base panel 302 and the arcuate walls 304 and 306. An insert sheet 310 is disposed over a portion of the base panel 302. Latch systems 100 are mounted onto the insert sheet 310.

Figure 12:
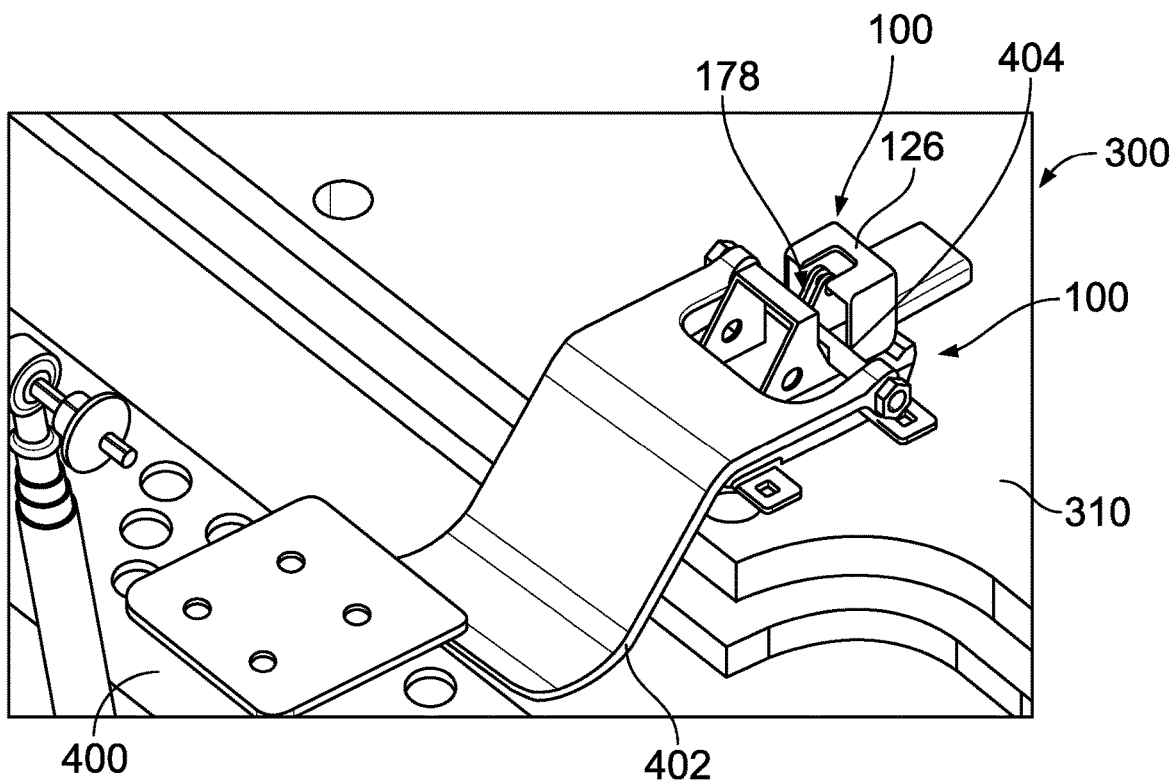
FIG. 12 illustrates an isometric top view of a portion of a bin assembly including a beam having a latch arm securely latched to a latch system of the header assembly, according to an example of the present disclosure.

FIG. 12 illustrates an isometric top view of a portion of a bin assembly 400 including a beam 402 having a latch arm 404 securely latched to a latch system 100 of the header assembly 300, according to an example of the present disclosure. The bin assembly 400 is an example of a second component 104 (shown in FIG. 1), or optionally a first component 102 (shown in FIG. 1). The latch arm 404 is securely latched within the arm channel 178 of the housing 126, as described herein.

Figure 13:
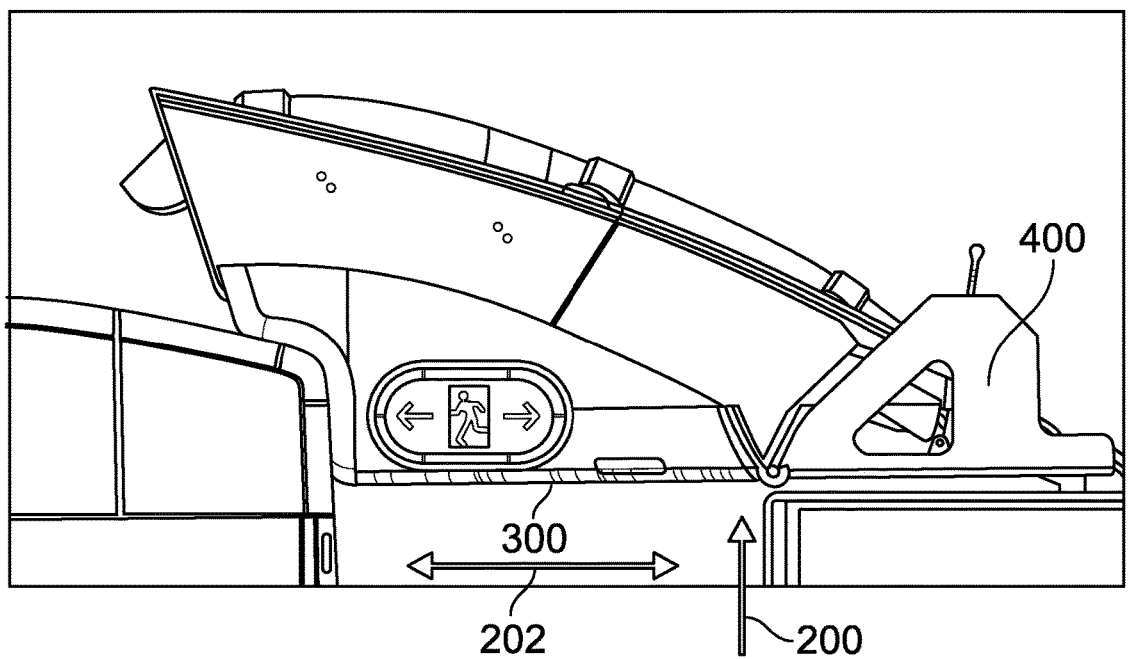
FIG. 13 illustrates a lateral view of the header assembly secured to a portion of a bin assembly, according to an example of the present disclosure.

FIG. 13 illustrates a lateral view of the header assembly 300 secured to the portion of the bin assembly 400, according to an example of the present disclosure. Referring to FIGS. 1-13, the latch system 100 allows the header assembly 300 to be adjusted relative to the portion of the bin assembly without being disconnected therefrom. As described herein, in order to adjust the header assembly 300 relative to the portion of the bin assembly 400, the header assembly 300 is urged upwardly in the direction of arrow 200 (such as at an outboard side, or optionally an inboard side), thereby disengaging the adjustment track(s) 162 of the slide plate 124 from the reciprocal adjustment track(s) 142 of the mounting base 120. With the force in the direction of arrow 200 being applied, the header assembly 300 can then be linearly moved in the direction of arrows 202 to a desired position, as described herein.

If adjustment is needed after the header assembly 300 is connected to the portion of the bin assembly 400, an individual can push up on the header assembly 300 proximate to the portion of the bin assembly 400 in the direction of arrow 200, and then slide to an adjusted position in the direction(s) of arrow 202. After the force in the direction of arrow 200 is released, the weight of the header assembly 300 locks it in place relative to the portion of the bin assembly 400. The spring member 122 (shown in FIG. 2, for example) reduces vibration between the mounting base 120 and the slide plate 124, and provides constant pressure therebetween to prevent the slide plate 124 from inadvertently moving relative to the mounting base 120 (such as during periods of turbulence during a flight, for example).

Figure 14:
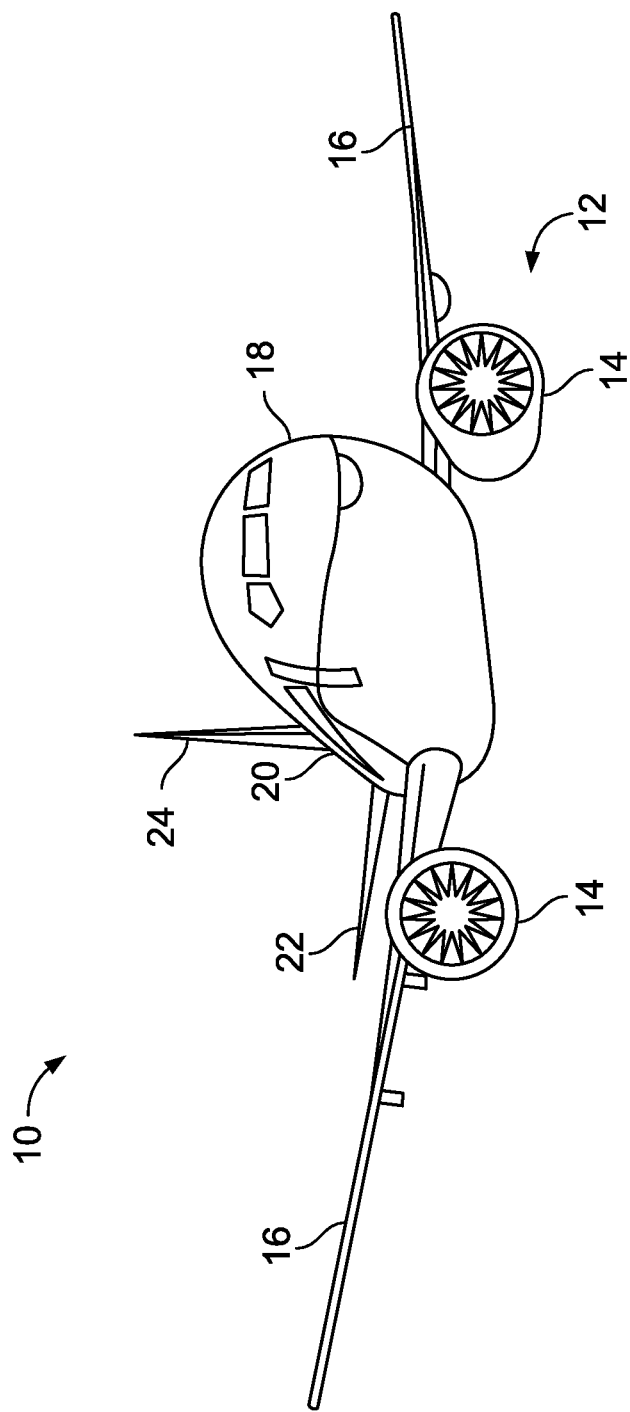
FIG. 14 illustrates an isometric front view of an aircraft, according to an example of the present disclosure.

FIG. 14 illustrates an isometric front view of a vehicle, such as an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

The internal cabin includes components that can be secured together via the latch system 100, shown and described with respect to FIGS. 1-13. For example, the internal cabin can include header assemblies coupled to other components, such as valences, overhead stowage bin assemblies, monuments, and the like via one or more latch systems 100.

Alternatively, instead of an aircraft, embodiments of the present disclosure may be used with various other vehicles, such as automobiles, buses, locomotives, and train cars, seacraft, spacecraft, and the like.

Figure 15A:
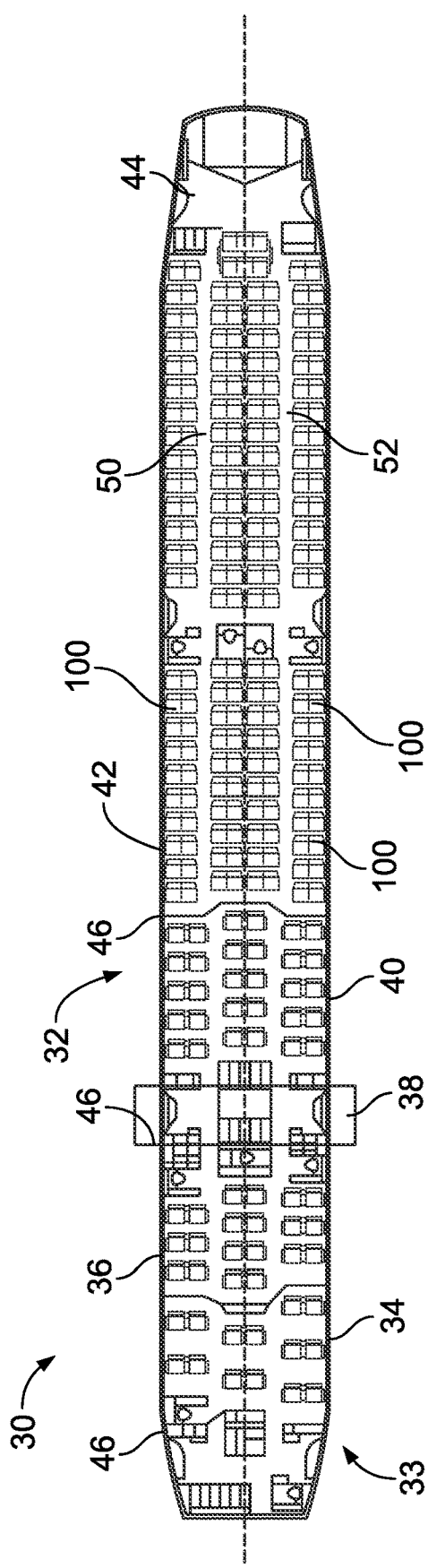
FIG. 15A illustrates a top plan view of an internal cabin of an aircraft.

FIG. 15A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 15A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

The internal cabin 30 shown in FIG. 15A is an example of an internal cabin of the aircraft 10, shown in FIG. 14.

Figure 15B:
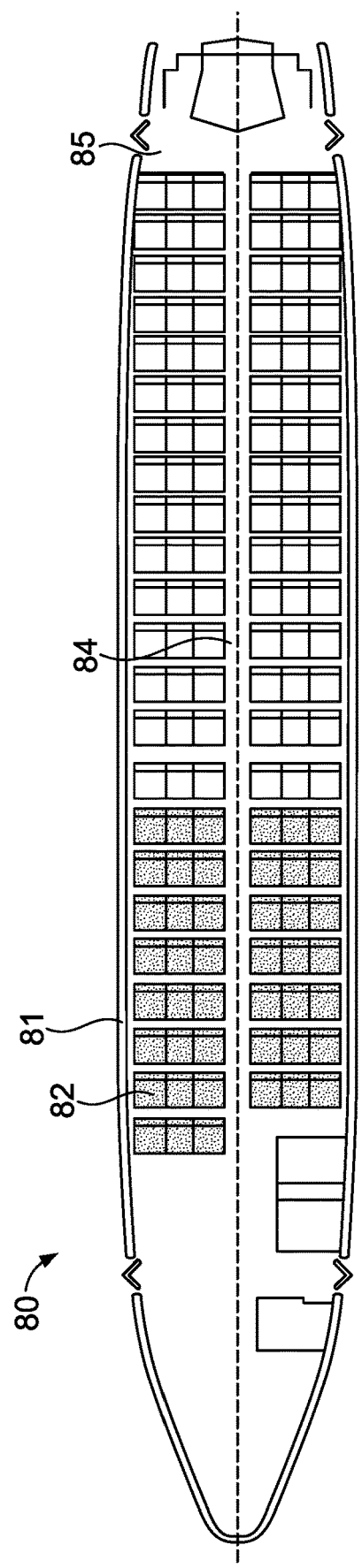
FIG. 15B illustrates a top plan view of an internal cabin of an aircraft.

FIG. 15B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

The internal cabin 30 shown in FIG. 15B is an example of an internal cabin of the aircraft 10, shown in FIG. 14.

Referring to FIGS. 1-15B, the latch system 100 is configured to provide inboard and outboard adjustment of a component, such as a header assembly, relative to another component, such as up to +/−0.5 inches (or optionally more). After the header assembly is installed, an individual is able to move the header assembly in outboard and inboard directions (such as in the directions of arrow 202) without disconnecting and lower the header assembly from the other component.

Figure 16:
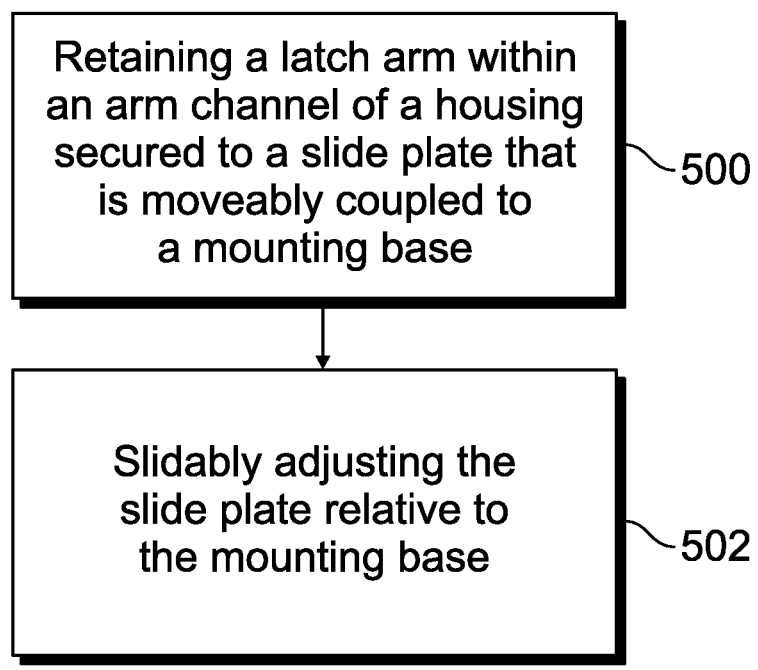
FIG. 16 illustrates a flow chart of a latch method configured to adjustably secure a first component to a second component, according to an example of the present disclosure.

FIG. 16 illustrates a flow chart of a latch method configured to adjustably secure a first component to a second component, according to an example of the present disclosure. Referring to FIGS. 1-16, the latch method includes retaining, at 500, a latch arm 404 within the arm channel 178 of the housing 126 secured to the slide plate 124 that is moveably coupled to the mounting base 120; and slidably adjusting, at 502, the slide plate 124 relative to the mounting base 120.

In at least one example, the first component 102 is a header assembly 300 within an internal cabin of a vehicle. The second component 104 is a structure (such as a portion of a bin assembly) that latchably secures to the header assembly 300 through the latch system 100. The mounting base 120 of the latch system 100 is securely fixed to one of the header assembly 300 or the structure.

In at least one example, the method also includes removably coupling one or more adjustment tracks 162 of the slide plate 124 to one or more reciprocal adjustment tracks 142 of the mounting base 120. For example, a first adjustment track 162a and a second adjustment track 162b removably couple to the one or more reciprocal adjustment tracks 142 of the mounting base 120.

In at least one example, the first adjustment track 162a is offset with respect to the second adjustment track 162b. Further, in at least one example, said removably coupling includes removing the slide plate 124 from the mounting base 120; rotating the slide plate 124 about the axis 220 to a different radial position relative to the mounting base 120; and re-inserting the slide plate 124 into the mounting base 120 at the different radial position.

In at least one example, the latch method also includes exerting, by the spring member 122 disposed between the mounting base 120 and the slide plate 124, a spring force between the mounting base 120 and the slide plate 124.

In at least one example, said slidably adjusting includes urging the mounting base 120 upwardly in relation to the slide plate 124; and sliding the mounting base 120 relative to the slide plate 124 during said urging.

Figure 17:
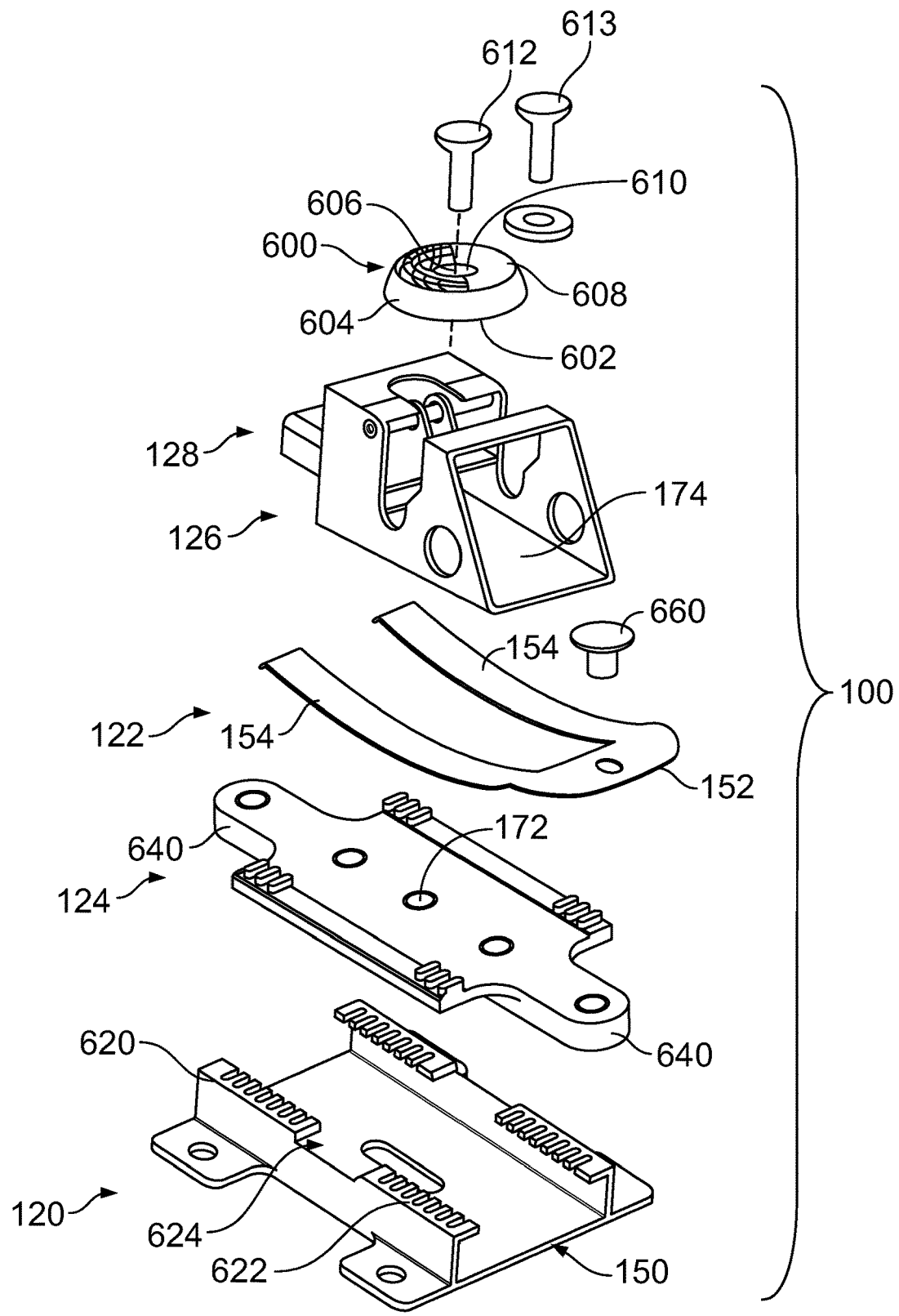
FIG. 17 illustrates an isometric exploded view of a latch system, according to an example of the present disclosure.
Figure 18:
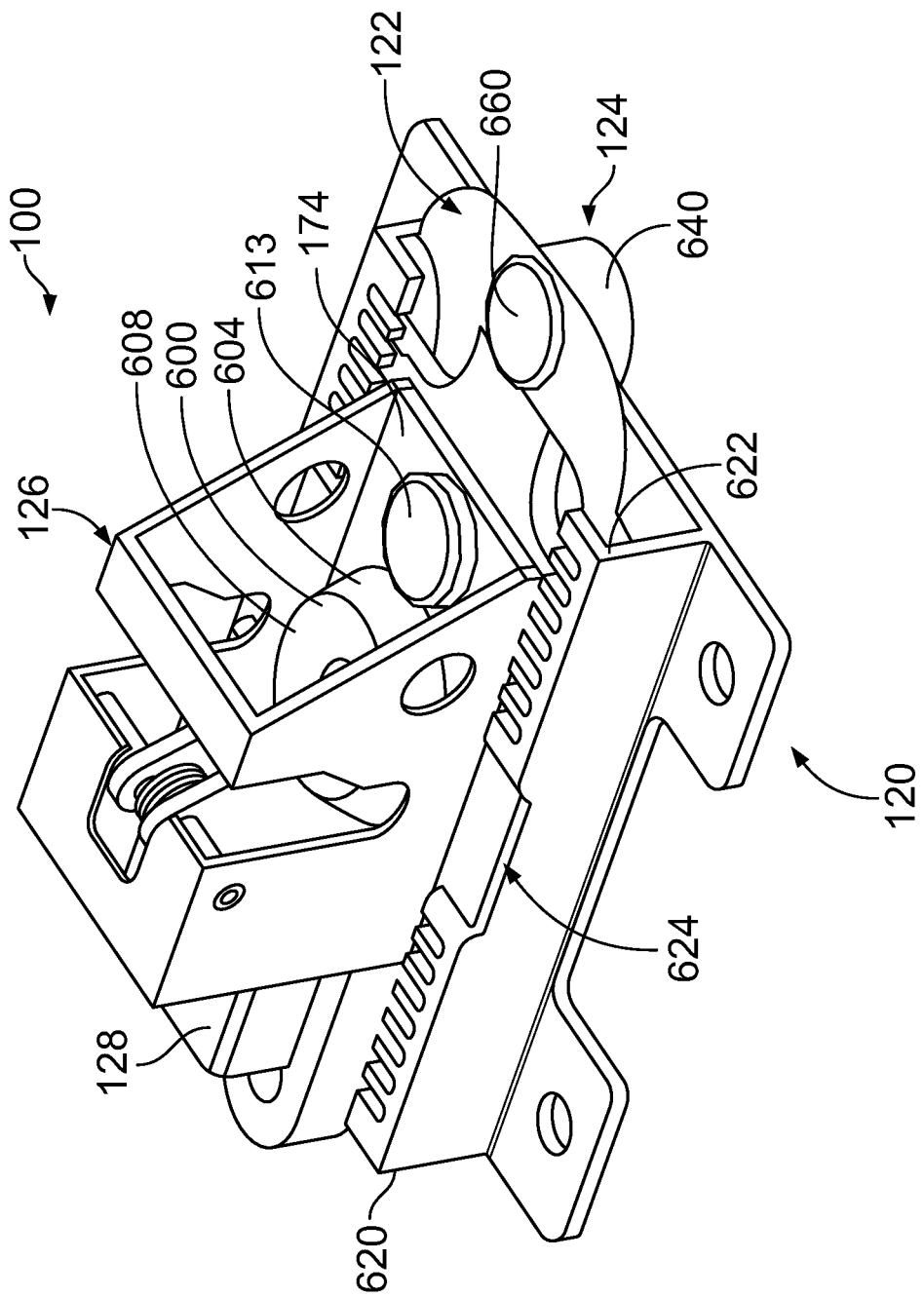
FIG. 18 illustrates an isometric view of the latch system of FIG. 17.

FIG. 17 illustrates an isometric exploded view of a latch system 100, according to an example of the present disclosure. FIG. 18 illustrates an isometric view of the latch system 100 of FIG. 17. Referring to FIGS. 17 and 18, the latch system 100 includes a mounting base 120, a spring member 122, a moveable slide plate 124, a housing 126, and a release lever 128 pivotally coupled to the housing 126.

In at least one example, the latch system 100 also includes a bumper 600. The bumper 600 can be formed of an elastomeric material. For example, the bumper 600 is formed of rubber. Optionally, the bumper 600 can be formed of a plastic.

The bumper 600 includes a flat support surface 602, and an annular wall 604 extending upwardly from the support surface 602. The annular wall 604 can inwardly cant toward a central axis 606 from the support surface 602 toward a top surface 608. A central channel 610 extends through the bumper 600, and is coaxially aligned with central axis 606. The central channel 610 is configured to receive a fastener 612 (such as a screw or bolt) having a shaft that extends through the central channel 610, into a through-hole of the base 174 of the housing 126, and into an aligned retaining hole 172 of the slide plate 124. In this manner, the bumper 600 is secured to the base 174 of the housing 126, which, in turn, is secured to the slide plate 124 through the fastener 612 (and optionally the fastener 613). The support surface 602 rests on a top surface of the base 174. Optionally, the bumper 600 can be secured to the base 174 through other types of fasteners, adhesives, and/or the like. Optionally, the bumper 600 can be sized and shaped differently than shown.

In operation, the bumper 600 is configured to restrain motion of a latch arm, such as the latch arm 404. For example, the latch arm is configured to be sandwiched between the top surface 608 of the bumper 600 and a lower surface of the lever 128, thereby securely holding the latch arm in position. In this manner, the bumper 600 prevents, limits, or otherwise reduces undesired motion of the latch arm, which could otherwise cause rattling, bouncing, and/or the like.

Figure 19:
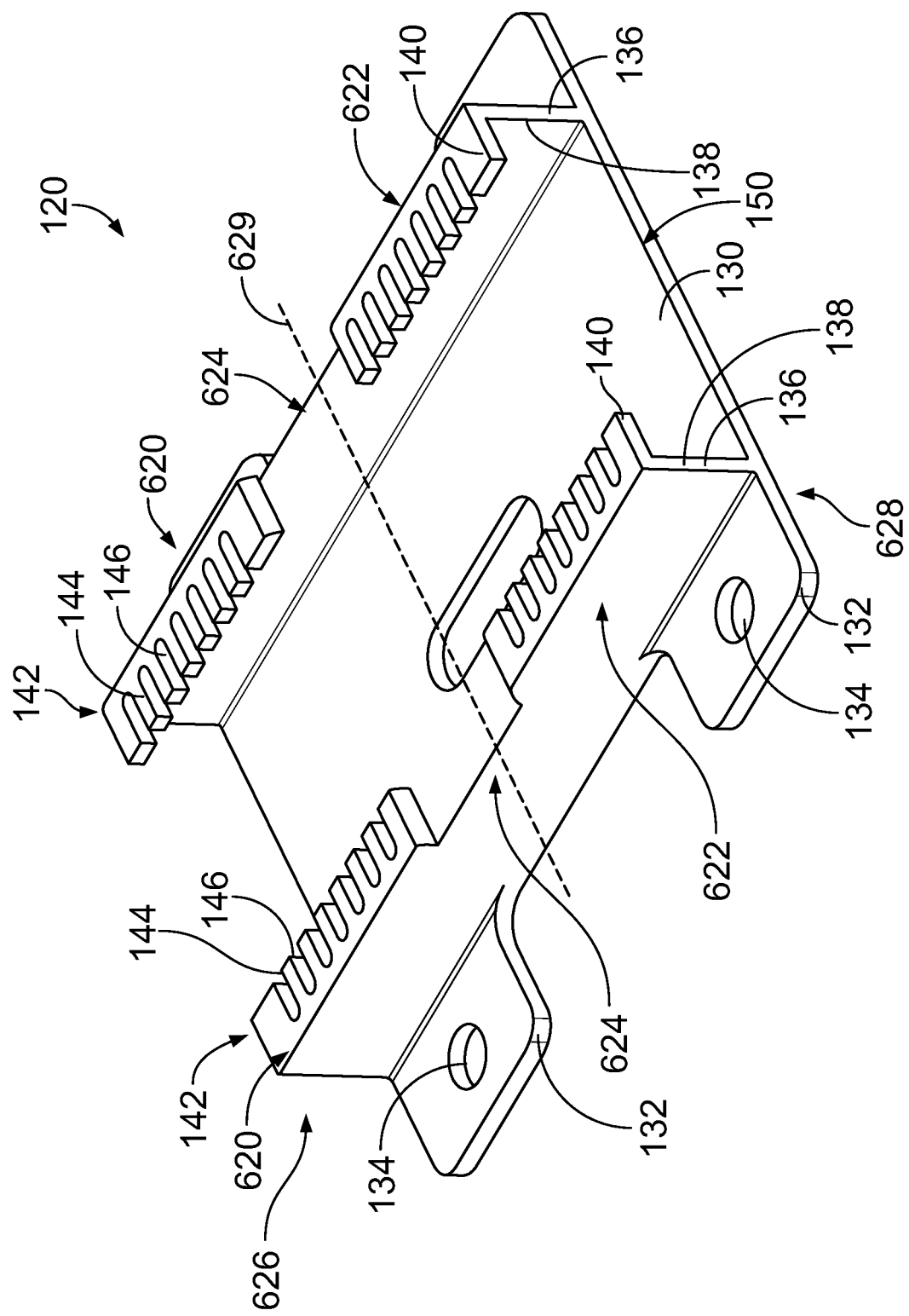
FIG. 19 illustrates an isometric top view of a mounting base, according to an example of the present disclosure.

FIG. 19 illustrates an isometric top view of the mounting base 120, according to an example of the present disclosure. The mounting base 120 includes a panel 130, which can be a flat, planar sheet. The panel 130 can include tabs 132 having through holes 134 that are configured to receive fasteners, such as screws, bolts, or the like. The panel 130 is configured to be fixedly secured to a structure, such as a surface of the first component 102 (or optionally, the second component 104), shown in FIG. 1. Opposed rails 136 upwardly extend from the panel 130. The opposed rails 136 are spaced apart from one another. Each rail 136 includes an extension wall 138 extending from the panel 130. An orthogonal cross ledge 140 angles inwardly from a top edge of the extension wall 138. The cross ledges 140 of the opposed rails 136 are directed toward one another. The cross ledge 140 can be perpendicular to the extension wall 138.

Each of the cross ledges 140 includes an adjustment track 142. The adjustment track 142 includes an alternating series of teeth 144 (for example, pins, peaks, posts, or the like) and retainers 146, such as recesses or openings. Optionally, only one of the cross ledges 140 may include an adjustment track 142.

In at least one example, each adjustment track 142 can include a first track segment 620 separated from a second track segment 622 by a gap 624. Unlike the track segments 620 and 622, the gap 624 does not include a cross ledge having teeth. The first track segment 620 can be disposed at a first end 626 of the mounting base 120, and the second track segment 622 can be disposed at a second end 628 of the mounting base 120, in which the second end 628 is opposite from the first end 626. The gap 624 can be aligned about a central lateral axis 629 of the mounting base 120.

Referring to FIGS. 17-19, the gaps 624 provide clearance spaces along the rails 126. The gaps 624 are configured to receive securing brackets that extend from the base panel 302 and/or insert sheet 310 (shown in FIG. 11), which can be used to secure the mounting bracket 120 thereto. The gaps 624 provide sufficient space to allow the securing brackets to snapably secure to the mounting base 120. Optionally, the rails 126 can be configured as shown and described with respect to FIG. 2, for example.

An adjustment channel 150 is defined between the panel 130 and the rails 136. The spring member 122 is disposed within the adjustment channel 150.

Figure 20:
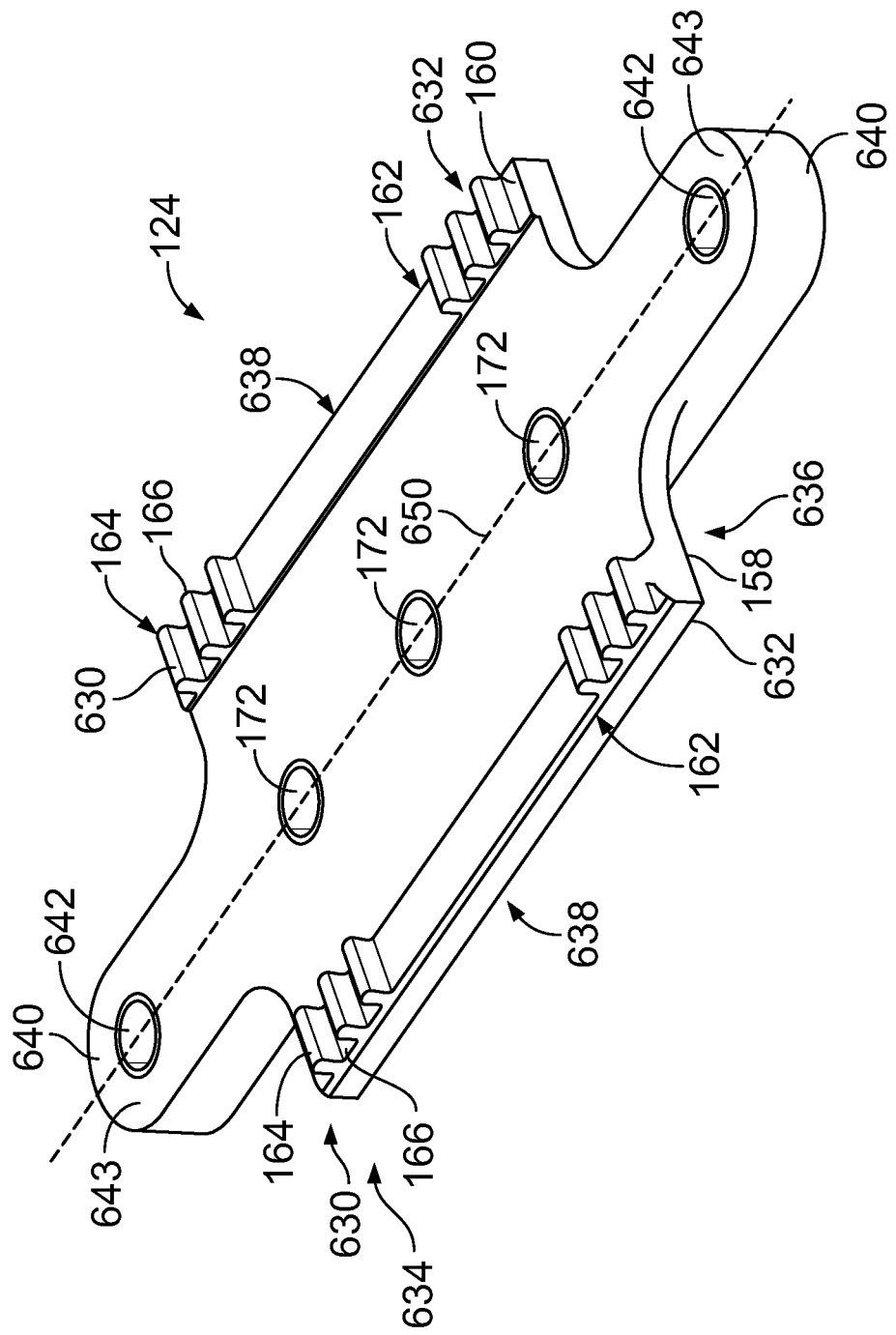
FIG. 20 illustrates an isometric top view of a slide plate, according to an example of the present disclosure.

FIG. 20 illustrates an isometric top view of the slide plate 124, according to an example of the present disclosure. The slide plate 124 includes a planar main body 158 and lateral ridges 160 extending upwardly from either side of the main body 158. Adjustment tracks 162 upwardly extend from the lateral ridges 160. Like the cross ledges 140 of the mounting base 120, the adjustment tracks 162 include an alternating series of teeth 164 and retainers 166, such as recesses or openings. Optionally, only one of the ridges 160 may include an adjustment track 162.

In order to conform to the segments 620 and 622 of the mounting base 120 (shown in FIGS. 17-19), the adjustment tracks 162 include segments 630 and 632 at opposite ends 634 and 636, respectively. The segments 630 and 632 are separated by a space 638. The segments 630 and 632 on the sides can be offset with respect to one another, as shown and described with respect to FIGS. 3 and 10. Optionally, the adjustment tracks 162 can be configured as shown and described with respect to FIG. 2, for example.

In at least one example, the slide plate 124 includes securing extensions 640 outwardly extending from one or both ends of the main body 158. The securing extensions 640 includes through holes 642, which are longitudinally aligned with the through holes 172 along a central longitudinal axis 650. Each through hole 172 is configured to receive and retain a fastener 660 (shown in FIGS. 17 and 18), which secures the spring member 122 to the slide plate 124.

Figure 21:
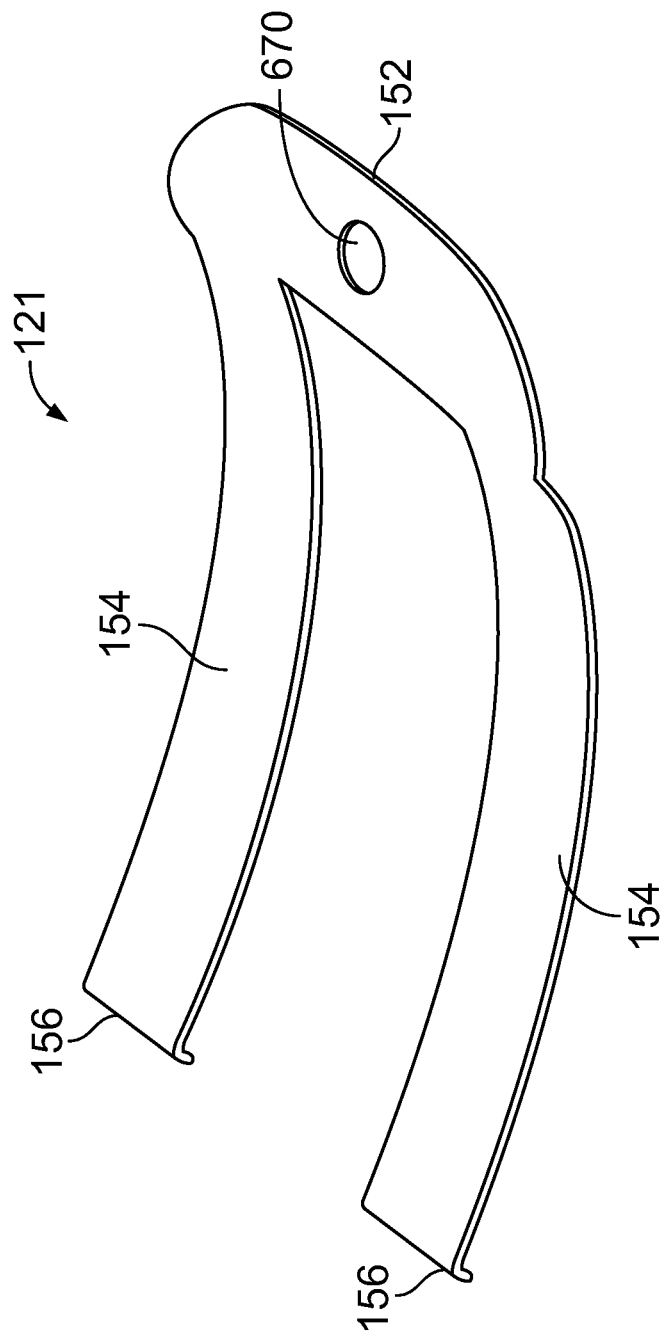
FIG. 21 illustrates an isometric top view of a spring member, according to an example of the present disclosure.

FIG. 21 illustrates an isometric top view of the spring member 122, according to an example of the present disclosure. In at least one example, the spring member 122 includes a cross strap 152 and arcuate, bowed legs 154 longitudinally extending from the cross strap 152. The legs 154 connect to distal feet 156. The cross strap 152 includes a through hole 670.

Referring to FIGS. 17-21, the spring member 122 is oriented such that the legs 154 downwardly bow into and against the panel 130. The cross strap 152 extends over a top surface 643 of a securing extension 640. Clearance areas on either side of the securing extensions 640 allow the legs 154 to extend on the sides of the securing extension 640, so that the cross strap 152 can extend over the top surface 643. The through hole 670 axially aligns with the through hole 642, thereby allowing the fastener 660 to secure the cross strap 152 (and therefore the spring member 122) to the slide plate 124.

Figure 22:
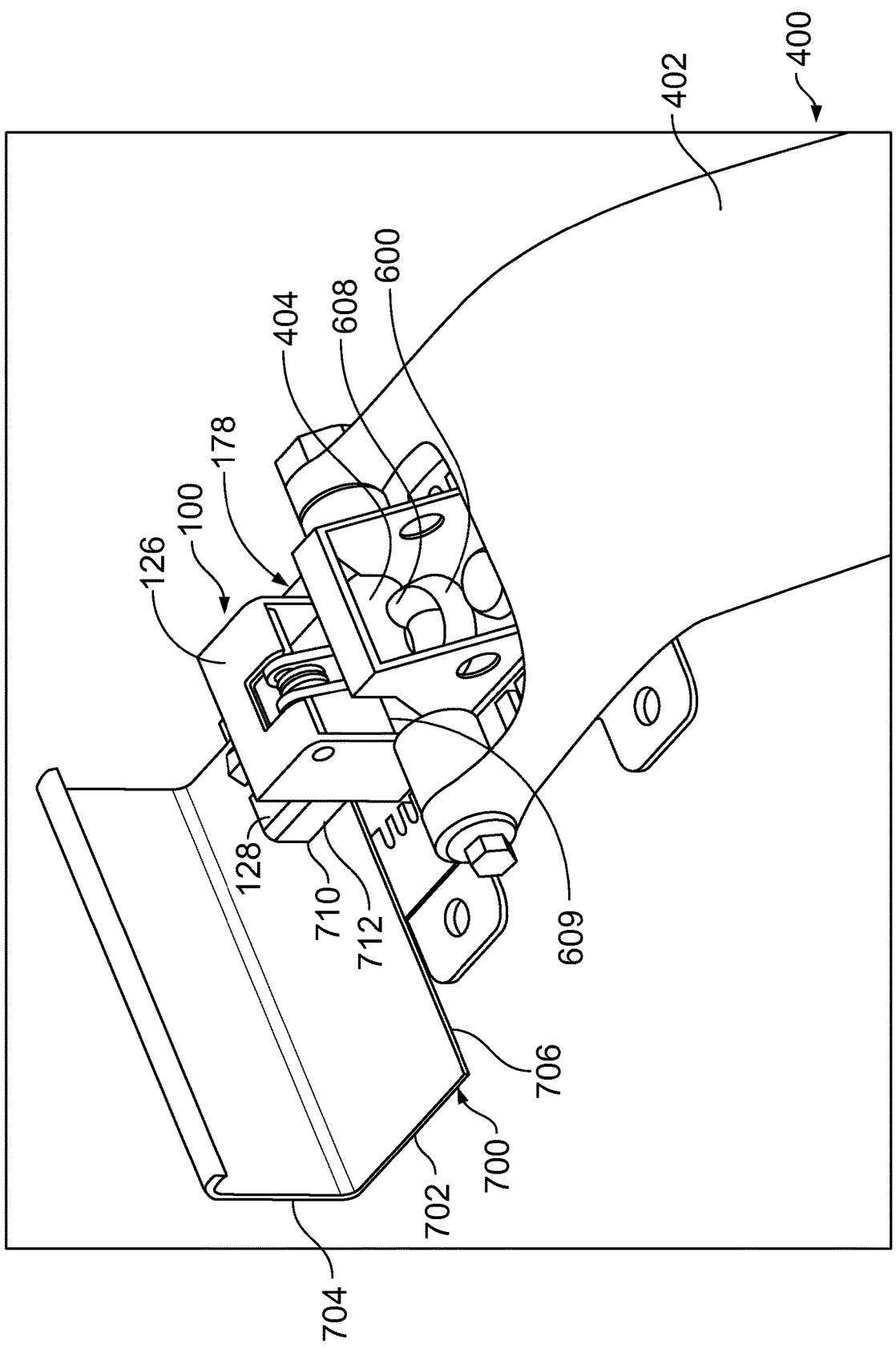
FIG. 22 illustrates an isometric top view of a portion of a bin assembly including a beam having a latch arm securely latched to a latch system, according to an example of the present disclosure.

FIG. 22 illustrates an isometric top view of a portion of a bin assembly 400 including a beam 402 having a latch arm 404 securely latched to the latch system 100, such as of a header assembly. The latch arm 404 is securely latched within the arm channel 178 of the housing 126, as described herein.

The bumper 600 restrains motion of the latch arm 404. As shown, the latch arm 404 is sandwiched between the top surface 608 of the bumper 600 and a lower surface 609 of the lever 128, thereby securely holding the latch arm 404 in position. Accordingly, the bumper 600 prevents, limits, or otherwise reduces undesired motion of the latch arm 404, which could otherwise cause rattling, bouncing, and/or the like.

In at least one example, a cuff bracket 700 can be coupled to the lever 128. The cuff bracket 700 includes a base wall 702. An extension wall 704 may upwardly extend from the base wall 702. The base wall 702 includes a free end 706. The release lever 128 includes a distal end 710 that is away from an interior portion of the housing 126. A lower surface 712 of the distal end 710 is secured to the free end 706 of the base wall 702, such as through one or more fasteners, adhesives, and/or the like.

The cuff bracket 700 can be used to move the release lever 128 to disengage the latch arm 404 from a secured position. For example, a device (such as a screwdriver, pry bar, beam, and/or the like) can be manipulated underneath the base wall 702 of the cuff bracket 700. As the device is upwardly moved into the base wall 702, the cuff bracket 700 upwardly moves (such as upwardly pivots), thereby causing the lever 128 to move in response thereto, which then releases the latch arm 404 from the secured position. Optionally, the latch system 100 may not include the cuff bracket 700.

Further, the disclosure comprises examples according to the following clauses:

Clause 1. A latch system configured to adjustably secure a first component to a second component, the latch system comprising:
a mounting base;
a slide plate moveably coupled to the mounting base, wherein the slide plate is configured to be slidably adjusted relative to the mounting base;
a housing secured to the slide plate, wherein the housing comprises an arm channel configured to receive and retain a latch arm; and a bumper coupled to the housing, wherein the bumper is configured to restrain motion of the latch arm within the arm channel.

Clause 2. The latch system of Clause 1, wherein the bumper is formed of rubber.

Clause 3. The latch system of Clauses 1 or 2, wherein the bumper comprises an annular wall extending from a support surface.

Clause 4. The latch system of Clause 3, wherein the annular wall inwardly cants from the support surface toward a central axis of the bumper.

Clause 5. The latch system of any of Clauses 1-4, wherein the bumper comprises a central channel that is configured to receive a fastener that secures the bumper to a base of the housing.

Clause 6. The latch system of any of Clauses 1-5, wherein the mounting base comprises one or more adjustment tracks, and wherein the one or more adjustment tracks comprise a first track segment separated from a second track segment by a gap.

Clause 7. The latch system of Clause 6, wherein the first track segment is disposed at a first end of the mounting base, wherein the second track segment is disposed at a second end of the mounting base, and wherein the gap is aligned about a central lateral axis of the mounting base.

Clause 8. The latch system of any of Clauses 1-7, wherein the slide plate comprises one or more securing extensions outwardly extending from one or both ends of a main body, wherein the one or more securing extensions are configured to receive one or more fasteners that are configured to secure a spring member to the slide plate.

Clause 9. The latch system of any of Clauses 1-8, further comprising a spring member disposed between the mounting base and the slide plate, wherein the spring member exerts a spring force between the mounting base and the slide plate, wherein the spring member comprises a cross strap, and bowed legs longitudinally extending from the cross strap.

Clause 10. The latch system of Clause 9, wherein the cross strap comprises a through hole configured to receive a fastener that secures the spring member to the slide plate.

Clause 11. The latch system of Clauses 9 or 10, wherein the bowed legs downwardly bow into and against a panel of the mounting base.

Clause 12. The latch system of any of Clauses 9-11, further comprising a release lever pivotally coupled to the housing, wherein the release lever is configured to pivot between a securing position, in which the latch arm is securely trapped within the arm channel, and a release position, in which the latch arm is removable from the arm channel.

Clause 13. The latch system of Clause 12, further comprising a cuff bracket coupled to the release lever.

Clause 14. The latch system of any of Clauses 1-13, wherein the first component is an assembly within an internal cabin of a vehicle, wherein the second component is a structure that latchably secures to the assembly through the latch system, and wherein the mounting base of the latch system is securely fixed to one of the assembly or the structure.

Clause 15. A latch system configured to adjustably secure a first component to a second component, the latch system comprising:

a mounting base including one or more adjustment tracks, wherein the one or more adjustment tracks comprise a first track segment separated from a second track segment by a gap;

a slide plate moveably coupled to the mounting base, wherein the slide plate is configured to be slidably adjusted relative to the mounting base, wherein the slide plate comprises one or more securing extensions outwardly extending from one or both ends of a main body;

a housing secured to the slide plate, wherein the housing comprises an arm channel configured to receive and retain a latch arm;

a release lever pivotally coupled to the housing, wherein the release lever is configured to pivot between a securing position, in which the latch arm is securely trapped within the arm channel, and a release position, in which the latch arm is removable from the arm channel;

a bumper coupled to the housing, wherein the bumper is configured to restrain motion of the latch arm within the arm channel; and a spring member disposed between the mounting base and the slide plate, wherein the spring member exerts a spring force between the mounting base and the slide plate, wherein the spring member comprises a cross strap, and bowed legs longitudinally extending from the cross strap, and wherein the one or more securing extensions receive one or more fasteners that secure the spring member to the slide plate.

Clause 16. The latch system of Clause 15, wherein the bumper is formed of rubber, wherein the bumper comprises an annular wall extending from a support surface, and wherein the annular wall inwardly cants from the support surface toward a central axis of the bumper.

Clause 17. The latch system of Clause 16, wherein the bumper comprises a central channel that is configured to receive a fastener that secures the bumper to a base of the housing.

Clause 18. The latch system of any of Clauses 15-17, wherein the first track segment is disposed at a first end of the mounting base, wherein the second track segment is disposed at a second end of the mounting base, and wherein the gap is aligned about a central lateral axis of the mounting base.

Clause 19. The latch system of any of Clauses 15-18, wherein the cross strap comprises a through hole that receives the one or more fasteners.

Clause 20. The latch system of any of Clauses 15-19, further comprising a cuff bracket coupled to the release lever.

Clause 21. A vehicle comprising:

an internal cabin;

a first component within the internal cabin;

a second component within the internal cabin; and a latch system that adjustably secures the first component to the second component, the latch system comprising:

a mounting base;

a slide plate moveably coupled to the mounting base, wherein the slide plate is configured to be slidably adjusted relative to the mounting base;

a housing secured to the slide plate, wherein the housing comprises an arm channel configured to receive and retain a latch arm; and a bumper coupled to the housing, wherein the bumper is configured to restrain motion of the latch arm within the arm channel.

As described herein, examples of the present disclosure provide latch systems and method that allow for adjustment of components after they are connected together. The latch systems and methods allow an individual to adjust a header assembly without removing the header assembly from another component, or performing additional rework.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A latch system configured to adjustably secure a first component to a second component, the latch system comprising:
    a mounting base;
    a slide plate moveably coupled to the mounting base, wherein the slide plate is configured to be slidably adjusted relative to the mounting base;
    a housing secured to the slide plate, wherein the housing comprises walls extending from a base, and an arm channel formed between and through the walls, wherein the arm channel is configured to receive and retain a latch arm;
    a release lever pivotally coupled to the housing, wherein one or more portions of the release lever are between the base and the walls of the housing, wherein the release lever is configured to pivot between a securing position, in which the latch arm is securely trapped within the arm channel, and a release position, in which the latch arm is removable from the arm channel; and
    a bumper coupled to the housing, wherein the bumper is configured to restrain motion of the latch arm within the arm channel, wherein the bumper comprises an annular wall extending from a support surface, and wherein the annular wall inwardly cants from the support surface toward a central axis of the bumper.

2. The latch system of claim 1, wherein the bumper is formed of rubber.

3. The latch system of claim 1, wherein the bumper further comprises a central channel that is configured to receive a fastener that secures the bumper to a base of the housing.

4. The latch system of claim 3, wherein the central channel is coaxial with the central axis, wherein the central channel is configured to receive the fastener having a shaft that extends through the central channel, into a through-hole of the base of the housing, and into an aligned retaining hole of the slide plate.

5. The latch system of claim 1, wherein the mounting base comprises one or more adjustment tracks, and wherein the one or more adjustment tracks comprise a first track segment separated from a second track segment by a gap.

6. The latch system of claim 5, wherein the first track segment is disposed at a first end of the mounting base, wherein the second track segment is disposed at a second end of the mounting base, and wherein the gap is aligned about a central lateral axis of the mounting base.

7. The latch system of claim 1, wherein the slide plate comprises one or more securing extensions outwardly extending from one or both ends of a main body, wherein the one or more securing extensions are configured to receive one or more fasteners that are configured to secure a spring member to the slide plate.

8. The latch system of claim 1, further comprising a spring member disposed between the mounting base and the slide plate, wherein the spring member exerts a spring force between the mounting base and the slide plate, wherein the spring member comprises a cross strap, and bowed legs longitudinally extending from the cross strap.

9. The latch system of claim 8, wherein the cross strap comprises a through hole configured to receive a fastener that secures the spring member to the slide plate.

10. The latch system of claim 8, wherein the bowed legs downwardly bow into and against a panel of the mounting base.

11. The latch system of claim 1, further comprising a cuff bracket coupled to the release lever.

12. The latch system of claim 1, wherein the first component is an assembly within an internal cabin of a vehicle, wherein the second component is a structure that latchably secures to the assembly through the latch system, and wherein the mounting base of the latch system is securely fixed to one of the assembly or the structure.

13. A latch system configured to adjustably secure a first component to a second component, the latch system comprising:

a mounting base including one or more adjustment tracks, wherein the one or more adjustment tracks comprise a first track segment separated from a second track segment by a gap;

a slide plate moveably coupled to the mounting base, wherein the slide plate is configured to be slidably adjusted relative to the mounting base, wherein the slide plate comprises one or more securing extensions outwardly extending from one or both ends of a main body;

a housing secured to the slide plate, wherein the housing comprises walls extending from a base, and an arm channel formed between and through the walls, wherein the arm channel is configured to receive and retain a latch arm;

a release lever pivotally coupled to the housing, wherein one or more portions of the release lever are between the base and the walls of the housing, wherein the release lever is configured to pivot between a securing position, in which the latch arm is securely trapped within the arm channel, and a release position, in which the latch arm is removable from the arm channel;

a bumper coupled to the housing, wherein the bumper is configured to restrain motion of the latch arm within the arm channel, wherein the bumper is formed of rubber, wherein the bumper comprises an annular wall extending from a support surface, and wherein the annular wall inwardly cants from the support surface toward a central axis of the bumper; and a spring member disposed between the mounting base and the slide plate, wherein the spring member exerts a spring force between the mounting base and the slide plate, wherein the spring member comprises a cross strap, and bowed legs longitudinally extending from the cross strap, and wherein the one or more securing extensions receive one or more fasteners that secure the spring member to the slide plate.

14. The latch system of claim 13, wherein the bumper further comprises a central channel that is configured to receive a fastener that secures the bumper to a base of the housing.

15. The latch system of claim 13, wherein the first track segment is disposed at a first end of the mounting base, wherein the second track segment is disposed at a second end of the mounting base, and wherein the gap is aligned about a central lateral axis of the mounting base.

16. The latch system of claim 13, wherein the cross strap comprises a through hole that receives the one or more fasteners.

17. The latch system of claim 13, further comprising a cuff bracket coupled to the release lever.

18. A vehicle comprising:

an internal cabin;

a first component within the internal cabin;

a second component within the internal cabin; and a latch system that adjustably secures the first component to the second component, the latch system comprising:

a mounting base;

a slide plate moveably coupled to the mounting base, wherein the slide plate is configured to be slidably adjusted relative to the mounting base;

a housing secured to the slide plate, wherein the housing comprises walls extending from a base, and an arm channel formed between and through the walls, wherein the arm channel is configured to receive and retain a latch arm;

a release lever pivotally coupled to the housing, wherein one or more portions of the release lever are between the base and the walls of the housing, wherein the release lever is configured to pivot between a securing position, in which the latch arm is securely trapped within the arm channel, and a release position, in which the latch arm is removable from the arm channel; and a bumper coupled to the housing, wherein the bumper is configured to restrain motion of the latch arm within the arm channel, wherein the bumper comprises an annular wall extending from a support surface, and wherein the annular wall inwardly cants from the support surface toward a central axis of the bumper.

19. The vehicle of claim 18, wherein the latch system further comprises a spring member disposed between the mounting base and the slide plate, wherein the spring member exerts a spring force between the mounting base and the slide plate, wherein the spring member comprises a cross strap, and bowed legs longitudinally extending from the cross strap.

20. The vehicle of claim 19, wherein the cross strap comprises a through hole configured to receive a fastener that secures the spring member to the slide plate.

21. The vehicle of claim 19, wherein the bowed legs downwardly bow into and against a panel of the mounting base.

* * * * *